United States Patent
Vinitsky

(10) Patent No.: US 12,519,938 B2
(45) Date of Patent: Jan. 6, 2026

(54) SYSTEM AND METHOD FOR TRANSMISSION OF VIDEO THROUGH UNSTABLE WIRELESS LINKS

(71) Applicant: GO4A LTD., Kibbutz Gazit (IL)

(72) Inventor: Alex Vinitsky, Kibbutz Gazit (IL)

(73) Assignee: GO4A LTD., Kibbutz Gazit (IL)

( * ) Notice: Subject to any disclaimer, the term of this patent is extended or adjusted under 35 U.S.C. 154(b) by 0 days.

(21) Appl. No.: 18/695,333

(22) PCT Filed: Sep. 23, 2022

(86) PCT No.: PCT/IB2022/058997
§ 371 (c)(1),
(2) Date: Mar. 25, 2024

(87) PCT Pub. No.: WO2023/047339
PCT Pub. Date: Mar. 30, 2023

(65) Prior Publication Data
US 2025/0008102 A1    Jan. 2, 2025

Related U.S. Application Data

(60) Provisional application No. 63/261,524, filed on Sep. 23, 2021, provisional application No. 63/261,525, filed on Sep. 23, 2021.

(51) Int. Cl.
H04N 19/119    (2014.01)
H04N 7/18    (2006.01)
H04N 19/172    (2014.01)
H04N 19/85    (2014.01)

(52) U.S. Cl.
CPC .......... *H04N 19/119* (2014.11); *H04N 7/183* (2013.01); *H04N 19/172* (2014.11); *H04N 19/85* (2014.11)

(58) Field of Classification Search
CPC .... H04N 19/119; H04N 19/172; H04N 19/85; H04N 7/183
USPC ....................................... 348/144
See application file for complete search history.

(56) References Cited

U.S. PATENT DOCUMENTS

| | | | |
|---|---|---|---|
| 2004/0076237 A1* | 4/2004 | Kadono | H04N 19/625 375/240.16 |
| 2007/0202842 A1 | 8/2007 | Shao et al. | |
| 2014/0307043 A1 | 10/2014 | Koninckx et al. | |
| 2018/0139021 A1* | 5/2018 | Atungsiri | H04J 11/00 |
| 2023/0353290 A1* | 11/2023 | Back | H04L 1/189 |

* cited by examiner

Primary Examiner — Allen C Wong
(74) Attorney, Agent, or Firm — Reches Patent

(57) ABSTRACT

A method for wirelessly transmitting video related content. The method may include receiving a video frame; generating, based on the video frame, multiple video sub-frames. The generating may include virtually segmenting the video frame to diagonal portions and assigning different diagonal portions to different video sub-frames; associating a unique sub-carrier of a group of sub-carriers for each sub-frame of the multiple video frames; and wirelessly transmitting a representation of the multiple video sub-frames over the group of sub-carriers.

14 Claims, 27 Drawing Sheets

| 1 | 2 | 3 | 4 | . | . | n | 1 | 2 | 3 | 4 | . | . | n | 1 | 2 |
|---|---|---|---|---|---|---|---|---|---|---|---|---|---|---|---|
| n | 1 | 2 | 3 | 4 | . | . | n | 1 | 2 | 3 | 4 | . | . | n | 1 |
| n-1 | n | 1 | 2 | . | 4 | . | . | n | 1 | 2 | . | 4 | . | . | n |
| n-2 | n-1 | n | . | . | 3 | 4 | . | . | n | 1 | . | . | 3 | 4 | . |
| . | . | . | . | . | . | . | . | . | . | . | . | . | . | . | . |
| . | . | . | . | . | . | . | . | . | . | . | . | . | . | . | . |
| . | . | . | . | . | . | . | . | . | . | . | . | . | . | . | . |
| m | m+1 | m+2 | . | . | . | . | . | . | . | . | . | . | . | . | . |

FIG. 2 <u>200</u>

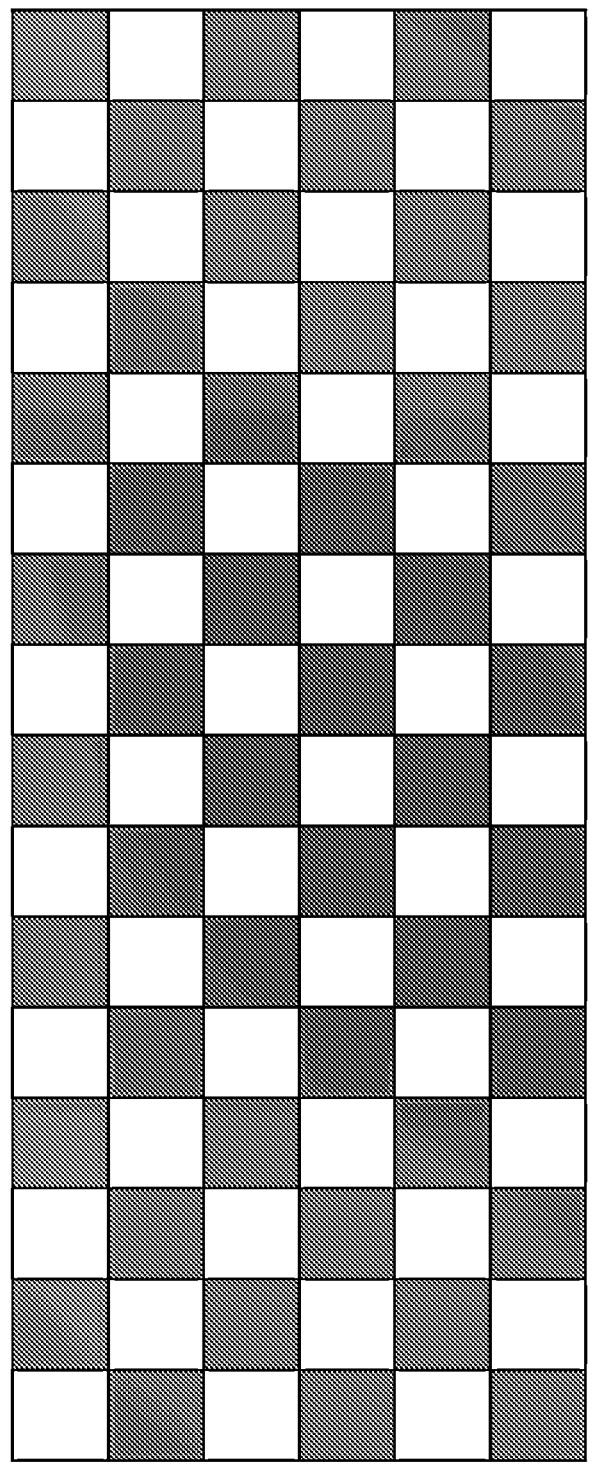
300
FIG. 3
Legend: 
Half-frame pixel | Zero value pixel

500

602
601
FIG. 6

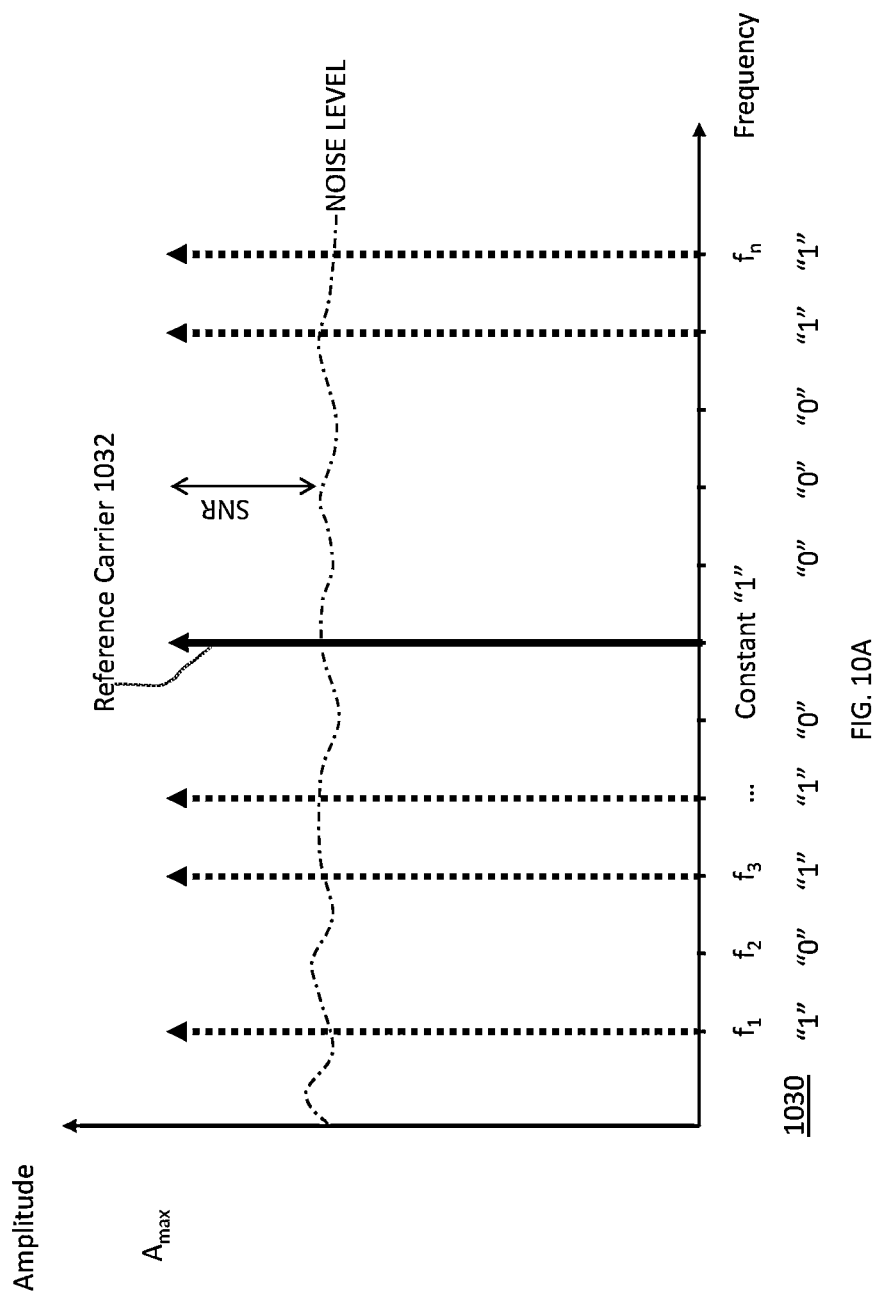

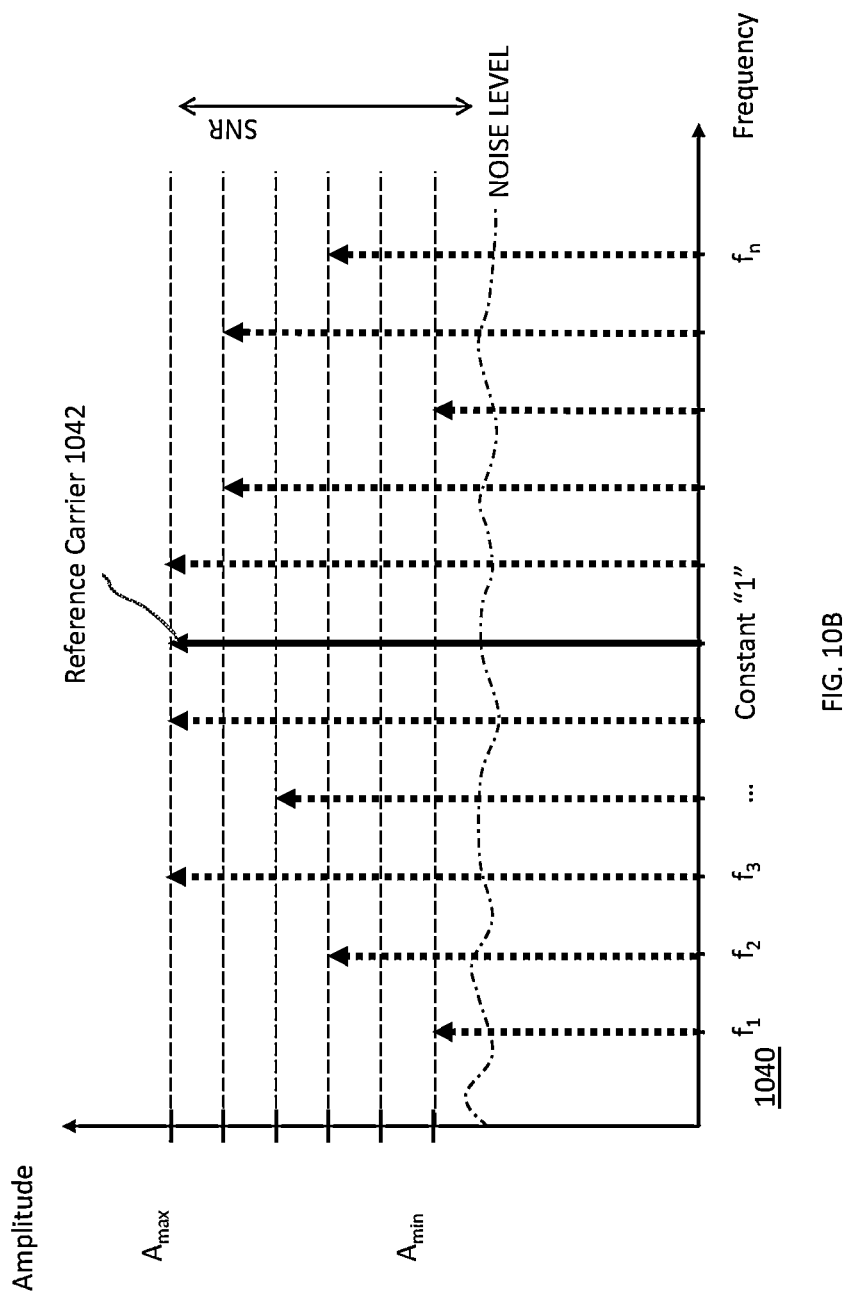

Wirelessly receiving a noisy representation of multiple video sub-frames carried over a group of sub-carriers. A unique sub-carrier of the group of sub-carriers was allocated to each sub-frame of multiple video sub-frames of a video frame. The video sub-frames were generated by virtually segmenting a video frame to diagonal portions and assigning different diagonal portions to different video sub-frames 1810

Reconstructing the video related content based on the noisy representation of multiple video sub-frames 1820

SYSTEM AND METHOD FOR TRANSMISSION OF VIDEO THROUGH UNSTABLE WIRELESS LINKS

CROSS REFERENCE

This application claims priority from U.S. provisional patent 63/261,524, filed Sep. 23, 2021, and from U.S. provisional patent 63/261,525, filed Sep. 23, 2021, which are incorporated herein by reference in their entirety.

BACKGROUND OF THE INVENTION

Transmitting video through radio communication medium requires a modulation process, thereby impressing it on the radio carrier wave. Digital modulation techniques, such as various QAM modulation schemes enable a relatively high channel capacity; however, Signal-to-Noise Ratio (SNR) degradation causes data corruption and results in increased latency, which is undesirable in certain tasks, such as teleoperation of highly mobile assets, e.g., remotely operated vehicles. On the other hand, traditional analog modulation techniques are less sensitive to SNR changes, but they require the incorporation of synchronization signals into the modulation scheme. When synchronization signals are lost due to low SNR, the video stream is interrupted.

It is therefore an object of the present invention, to provide a new modulation method for video transmission, that improves link robustness and latency in wireless real-time applications that suffer from noise uncertainty or low SNR.

Wireless transmission of raw video footage requires large bandwidth; therefore, video compression is used to decrease the amount of data. The compression is achieved by data encoding with video coding formats such as H.264 (MPEG-4). However, data compression introduces latency into the system, which depends on the quality of the wireless link. Latency is highly undesirable during the real-time teleoperation of remote vehicles or robots. It is therefore an object of the present invention, to provide a system and set of methods for transmission of video footage with low latency and to minimize the dependency of the latency on the quality of the wireless link.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 illustrates a Uni Weight Image Sub Framing (UWISF) method according to an embodiment;

FIG. 3 illustrates a Half Resolution Zero Padding frame reconstruction method according to an embodiment;

FIG. 6 shows an example of a row frame and a subframe generated by the UWISF method, according to an embodiment;

FIGS. 10A and 10B illustrate example of an OFDM-RASK modulation scheme according to an embodiment; 10A illustrates a Binary modulation scheme based on the OFDM-RASK while 10B illustrates an M-ary option based on it.

FIG. 18 illustrates an example of a method;

DETAILED DESCRIPTION OF THE DRAWINGS

Figure 1:
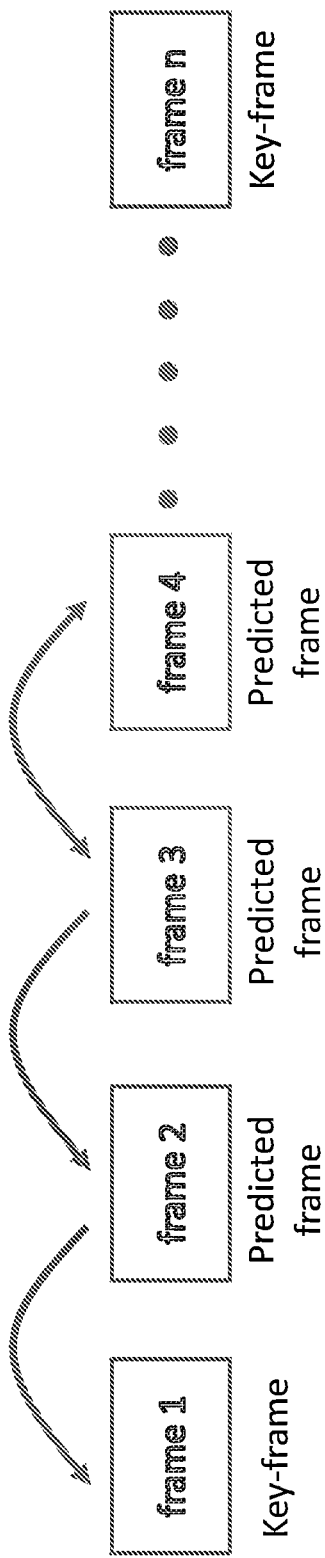
FIG. 1 illustrates a prior art example of the digital video compression method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

FIG. 1 illustrates a prior art example 10 of the digital video compression method. The illustration shows the dependency of the predicted frames on their neighbors, contrary to the keyframes.

FIG. 2 illustrates a Uni Weight Image Sub Framing (UWISF) method according to an embodiment. The Figure illustrates an image or a frame 200, whereas each cell represents a single pixel in that frame. The numbers inside the cells represent the numbers of video-subframes created by the method. For example—four diagonal portions denoted 201, 202, 203 and 204.

FIG. 3 illustrates a Half Resolution Zero Padding frame image processing method according to an embodiment. The figure illustrates the half-frame during its reconstruction and projection, whereas each cell represents a single pixel in that reconstructed half-frame. The white pixels of frame 300 belong to half-frame that is transmitted while the black cells belong to the half-frame that is not transmitted at the same single transmission timeslot.

Figure 4:
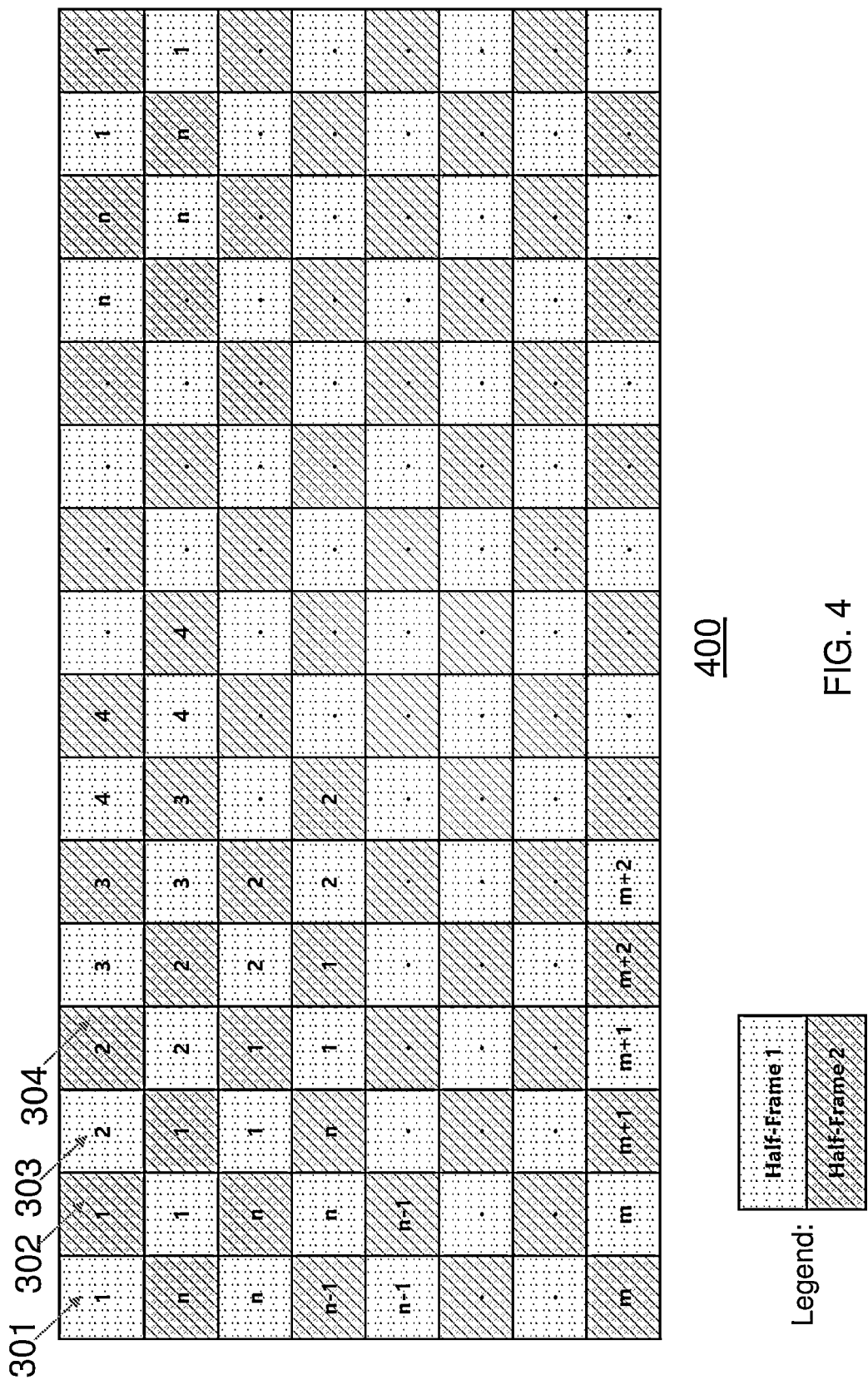
FIG. 4 illustrates a Uni Weight Image Sub Framing (UWISF) method, combined with Half Resolution Zero Padding according to an embodiment.

FIG. 4 illustrates a Uni Weight Image Sub Framing (UWISF) method, combined with Half Resolution Zero Padding according to an embodiment. The Figure illustrates an image or a frame 400, whereas each cell represents a single pixel in image frame. The two different patterns of the cells represent two half-frames, whereas the numbers inside the cells represent the numbers of subframes created by the method. The four diagonal portions of FIG. 2 are converted to two pairs of diagonal portions—301 and 303 that belong to a first half-frame and 302 and 304 that belong to the second half frame. The indexes within FIG. 4 differ from those of FIG. 2—and include a first set of indexes for the first half-frame (start at 1) and the second set of indexes for the second half-frame (also starts at 1).

Figure 5:
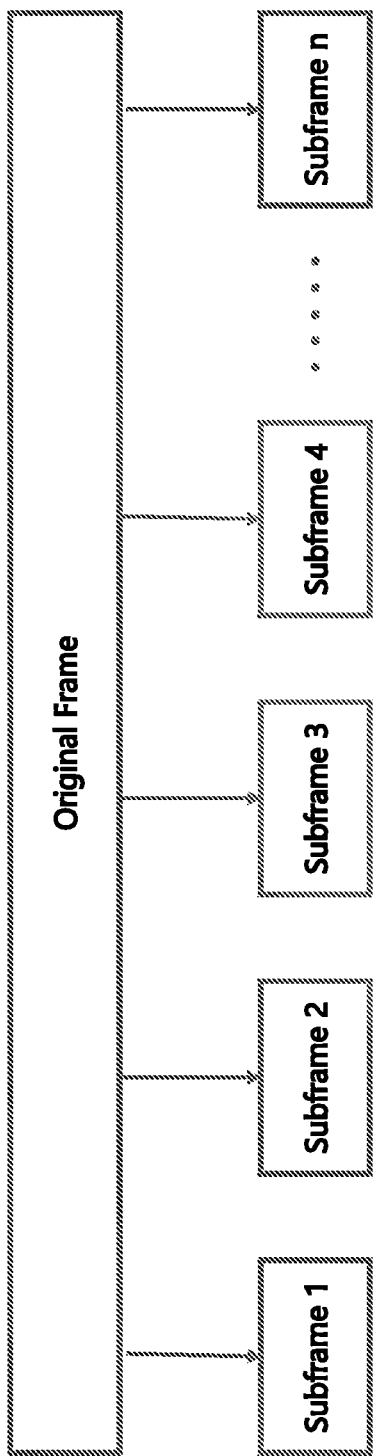
FIG. 5 illustrates a result of frame partitioning by the UWISF method according to an embodiment.

FIG. 5 illustrates a result of frame partitioning 500 by the UWISF method according to an embodiment.

FIG. 6 shows an example of a row frame and a subframe 602 generated by the UWISF method, from image 601, according to an embodiment.

Figure 7:
FIG. 7 shows an example of a half-frame generated by a Half Resolution Zero Padding pre-processing method according to an embodiment.

FIG. 7 shows an example of a half-frame 700 generated by a Half Resolution Zero Padding pre-processing method according to an embodiment.

Figure 8:
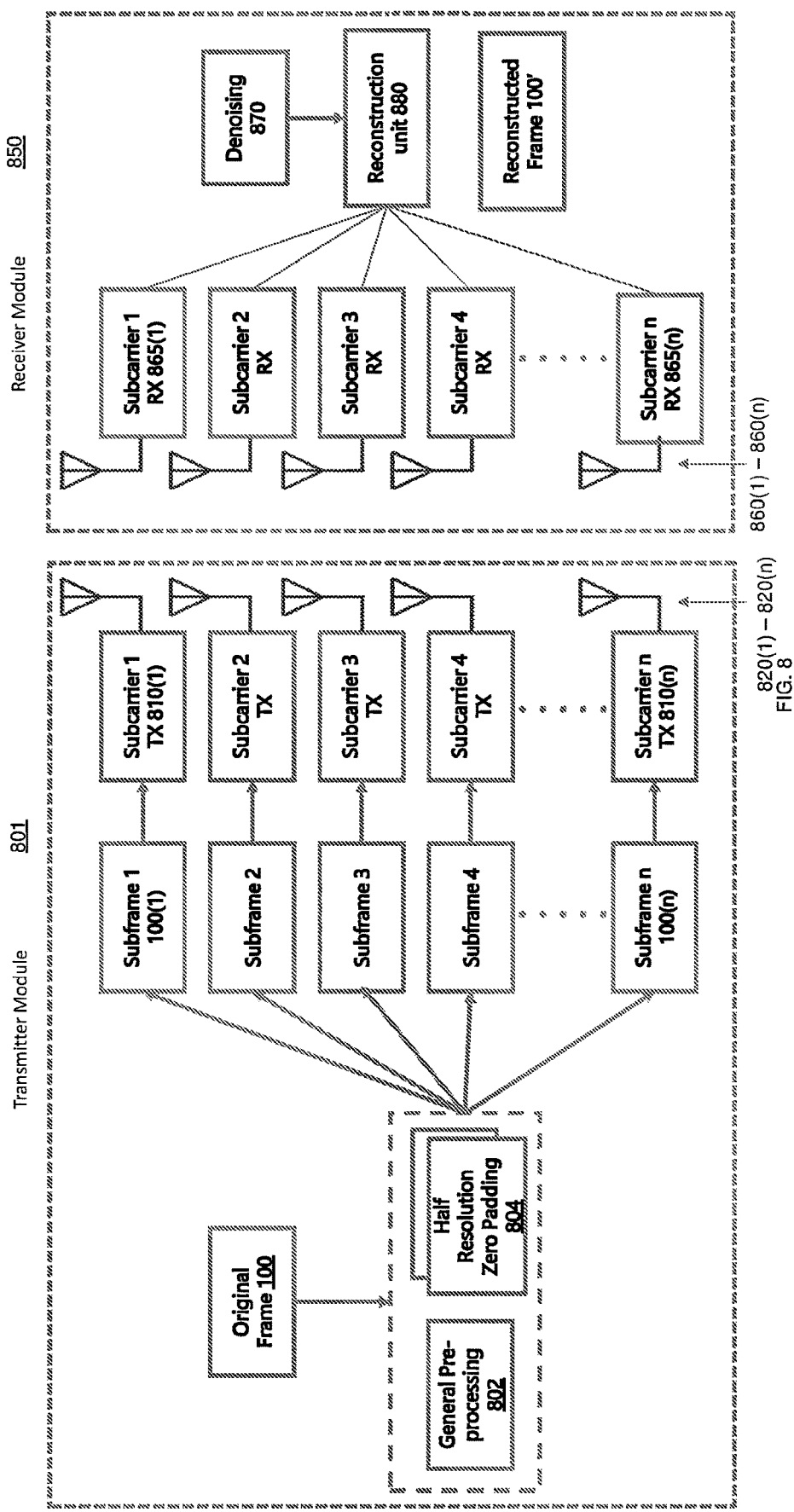
FIG. 8 illustrates video footage transmit and receive systems according to an embodiment.

FIG. 8 illustrates video footage transmit and receive systems according to an embodiment. The transmitter module 801 include a general pre-processing unit 802 and/or HRZP unit 804 that feed different subframes 100(1)-100(n) to n subcarrier transmission units 810(1)-810(n) that feed their outputs to n antennas 820(1)-820(n). The receiver module 850 includes n antennas 860(1)-860(n) that feed n sub-carrier reception units 865(1)-865(n) to reconstruction unit 880 (that may also include or access a denoising unit 870) to provide reconstructed frame 100'.

Figure 9:
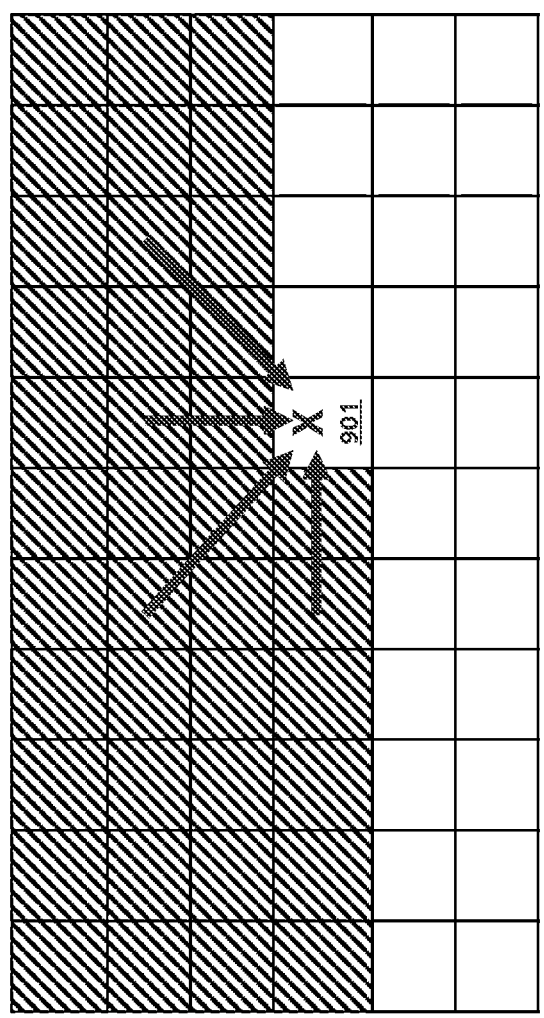
FIG. 9 illustrates real-time frame denoising based on the last valid neighbor method according to an embodiment.

FIG. 9 illustrates real-time frame 900 denoising based on the last valid neighbor method according to an embodiment.

The Figure illustrates an image or a frame, whereas each cell represents a single pixel in that frame. The patterned cells represent all optional valid neighbors' pixels for the invalid pixel represented by a cell 910 (X).

Figure 10:
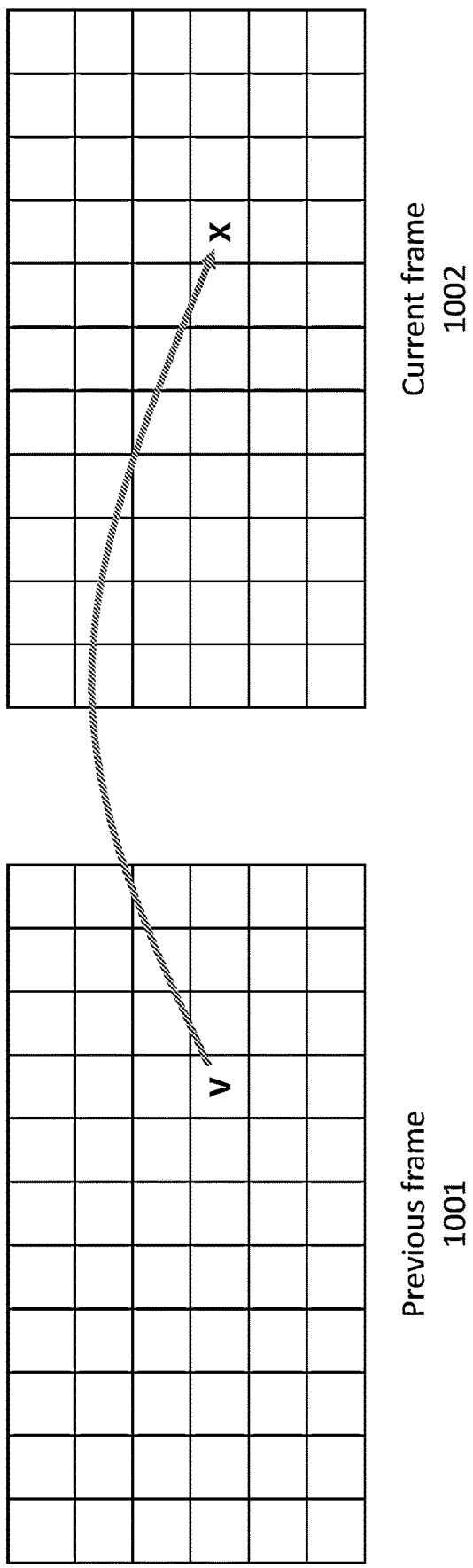
FIG. 10 illustrates real-time frame denoising based on previously reconstructed frames, according to an embodiment.

FIG. 10 illustrates real-time frame denoising based on previously reconstructed frames, according to an embodiment. The Figure illustrates two images or frames 1001 and 1002, whereas each cell represents a single pixel in that frame. The invalid pixels in the current frame 102 are replaced by a valid pixel that is located at the same coordinates on the previous frame 101.

FIG. 10A illustrates an example 1030 of an OFDM-RASK modulation scheme working in binary mode. It shows the reference carrier 1032.

FIG. 10B illustrates an example 1040 of an OFDM-RASK modulation scheme working in M-ary mode. It shows the reference carrier 1042.

Figure 11:
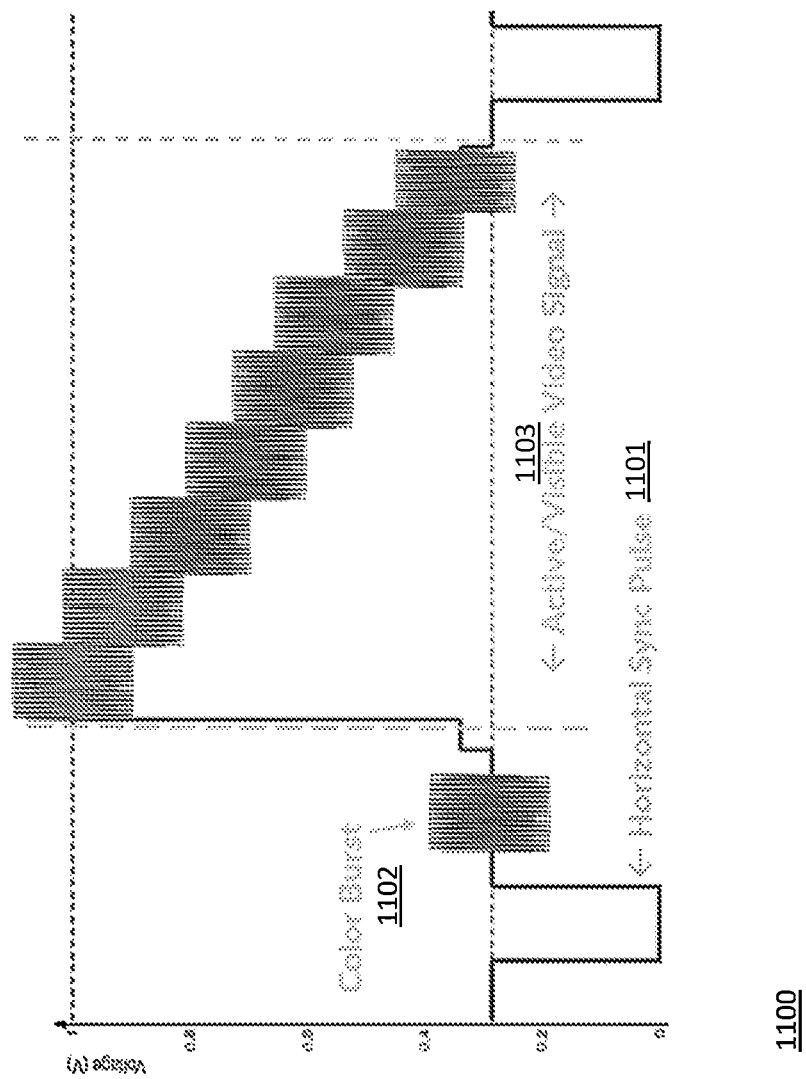
FIG. 11 illustrates a prior art analog video modulation.

FIG. 11 illustrates a prior art analog video modulation 1100. Transmission of a single row in a frame begins with a synchronization pulse 1101, continues with a color burst 1102 followed by pixel information 1103, and a new row is indicated by a new synchronization pulse.

Figure 12:
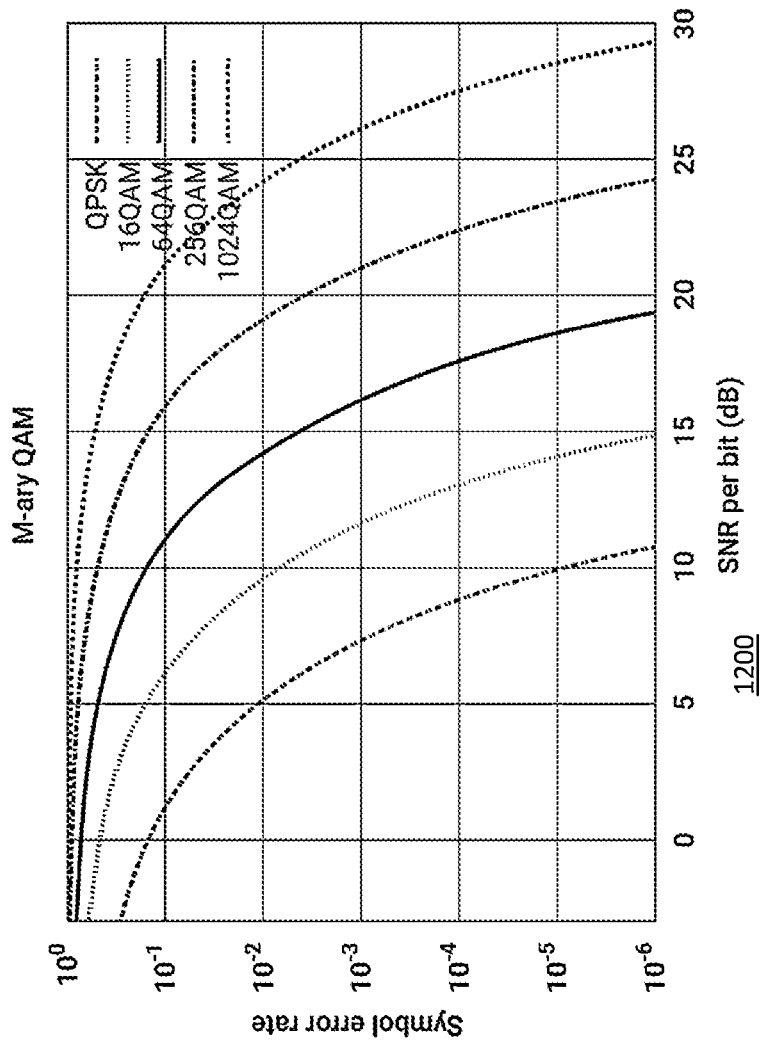
FIG. 12 illustrates a prior art error rate dependency on signal-to-noise ratio in different digital modulation schemes, in static applications.

FIG. 12 illustrates a prior art error rate dependency on signal-to-noise ratio 1200 in different digital modulation schemes, in static applications.

Figure 13A:
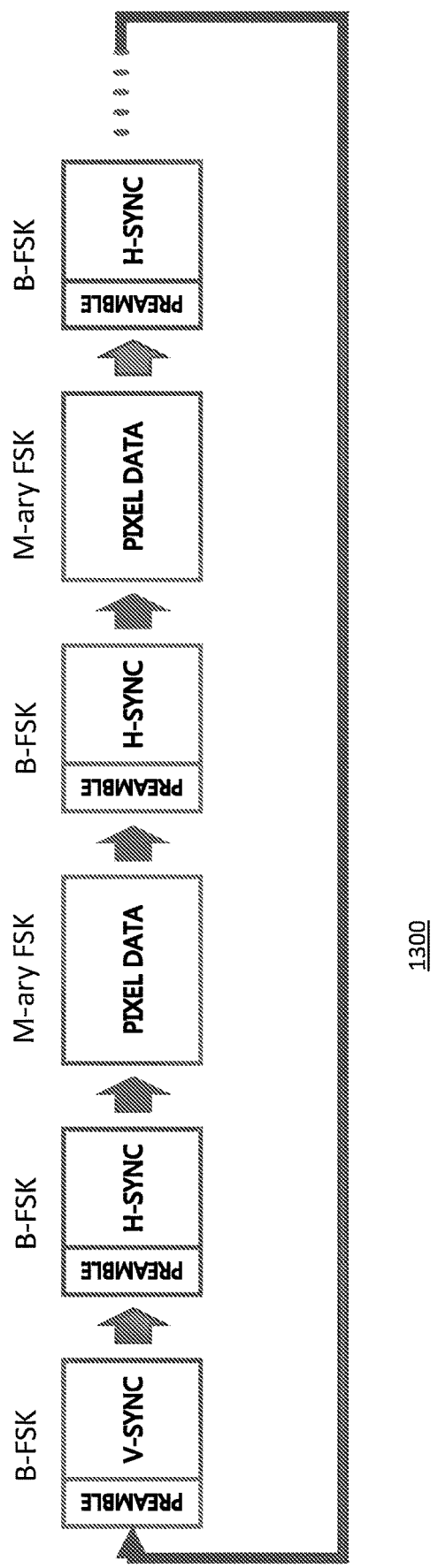
FIG. 13A illustrates the ASVM transmitting sequence of a single frame, with the different types of data using different modulation schemes in a single channel, according to an embodiment.

FIG. 13A illustrates the ASVM transmitting sequence 1300 of a single frame, with the different types of data using different modulation schemes in a single channel, according to an embodiment.

Figure 13B:
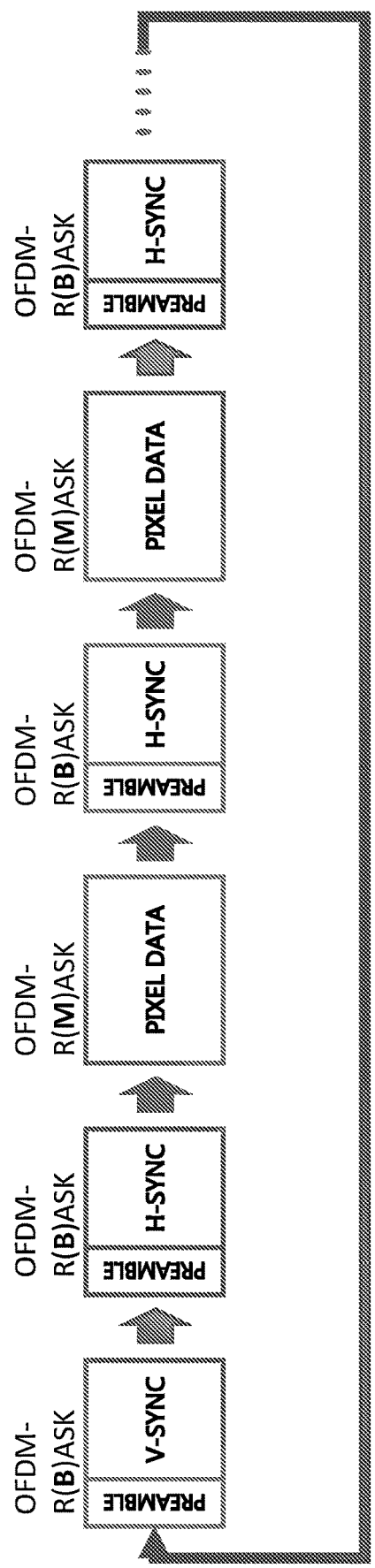
FIG. 13B illustrates the OFDM-RASK transmitting sequence of a single frame, with the different types of data using different modulation schemes in a single channel, according to an embodiment.

FIG. 13B illustrates the OFDM-RASK transmitting sequence 1310 of a single frame, with the different types of data using different modulation schemes in a single channel, according to an embodiment.

Figure 14:
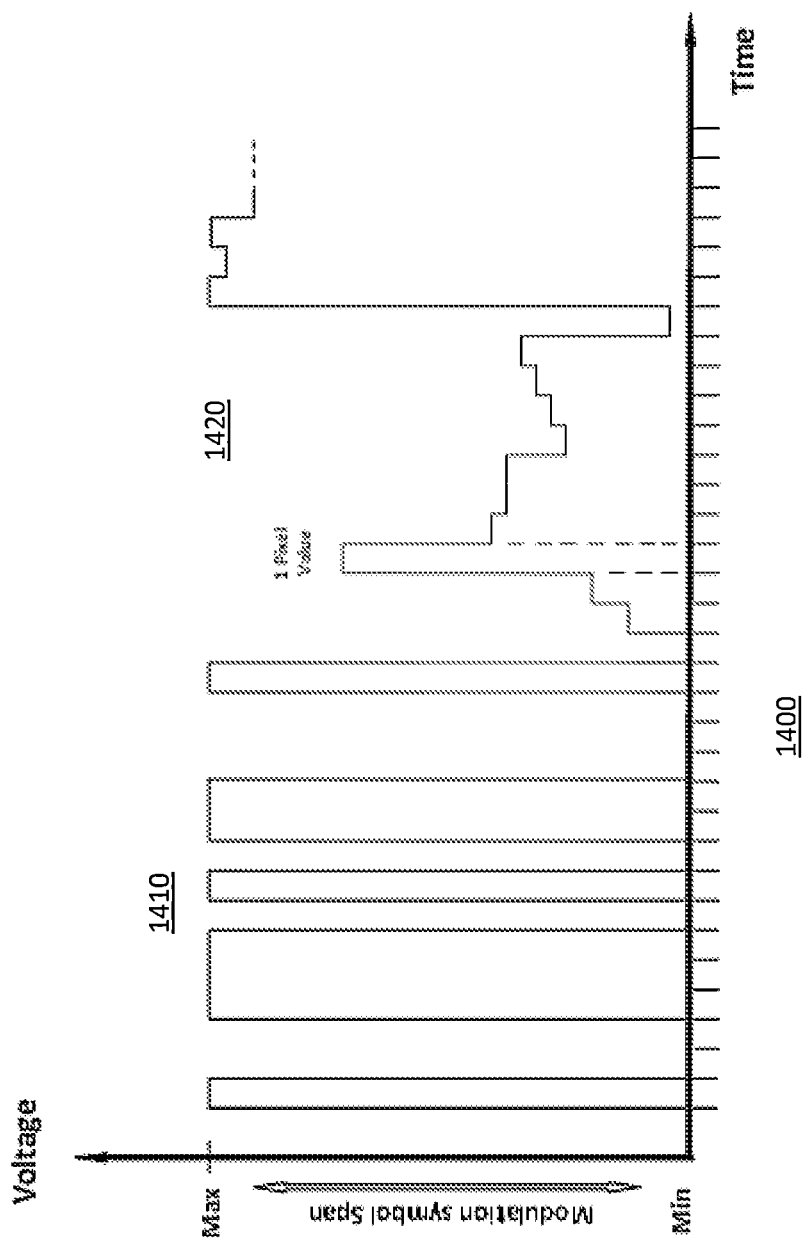
FIG. 14 illustrates the ASVM or OFDM-RASK method, whereas the synchronization data (i.e., V-sync word and H-sync word) is transmitted using a binary modulation scheme, and the pixel data is transmitted using an M-ary modulation scheme, according to an embodiment.

FIG. 14 is a timing diagram 1400 that illustrates the ASVM or OFDM-RASK method, whereas the synchronization data (i.e., V-sync word and H-sync word) is transmitted 1410 using a binary modulation scheme, and the pixel data is transmitted 1420 using an M-ary modulation scheme, according to an embodiment.

Figure 15:
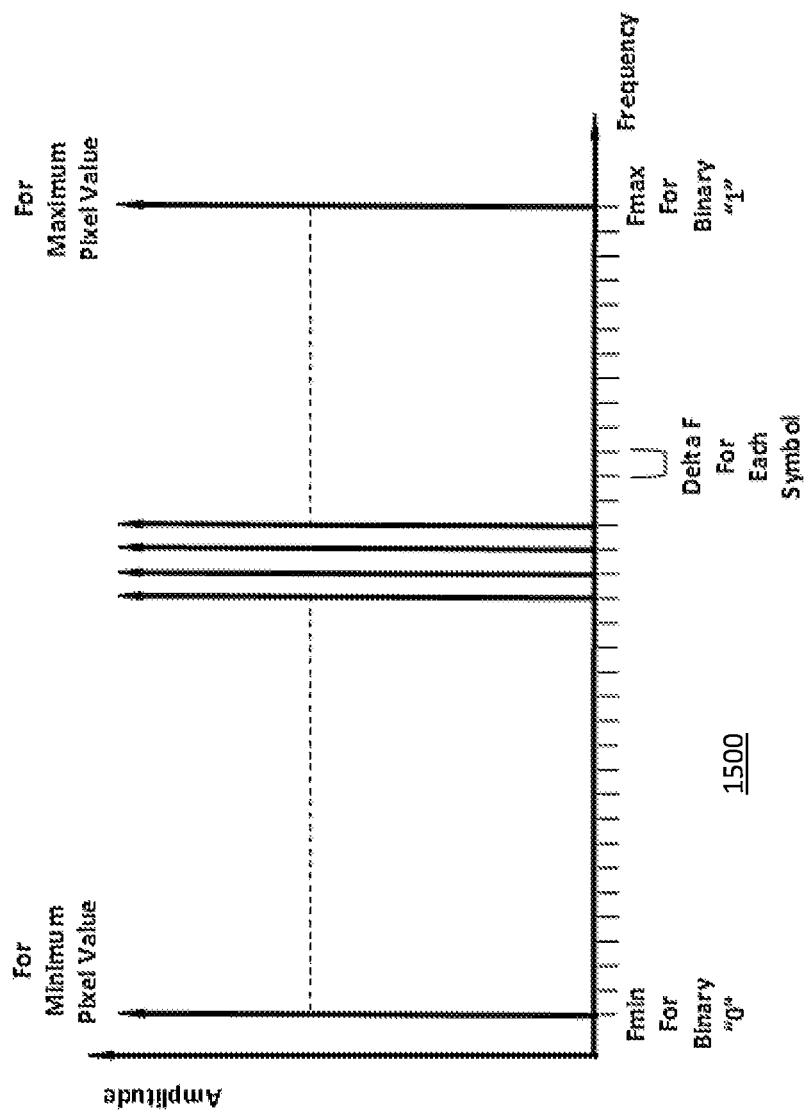
FIG. 15 illustrates the output of the ASVM method using M-ary FSK modulation, according to an embodiment.

FIG. 15 illustrates the output 1500 of the ASVM method using M-ary FSK modulation, according to an embodiment. $F_{min}$ represents the binary 0 and $F_{max}$ represents the binary 1 in B-FSK. Each frequency line represents a single symbol of the pixel-value alphabet.

Figure 16:
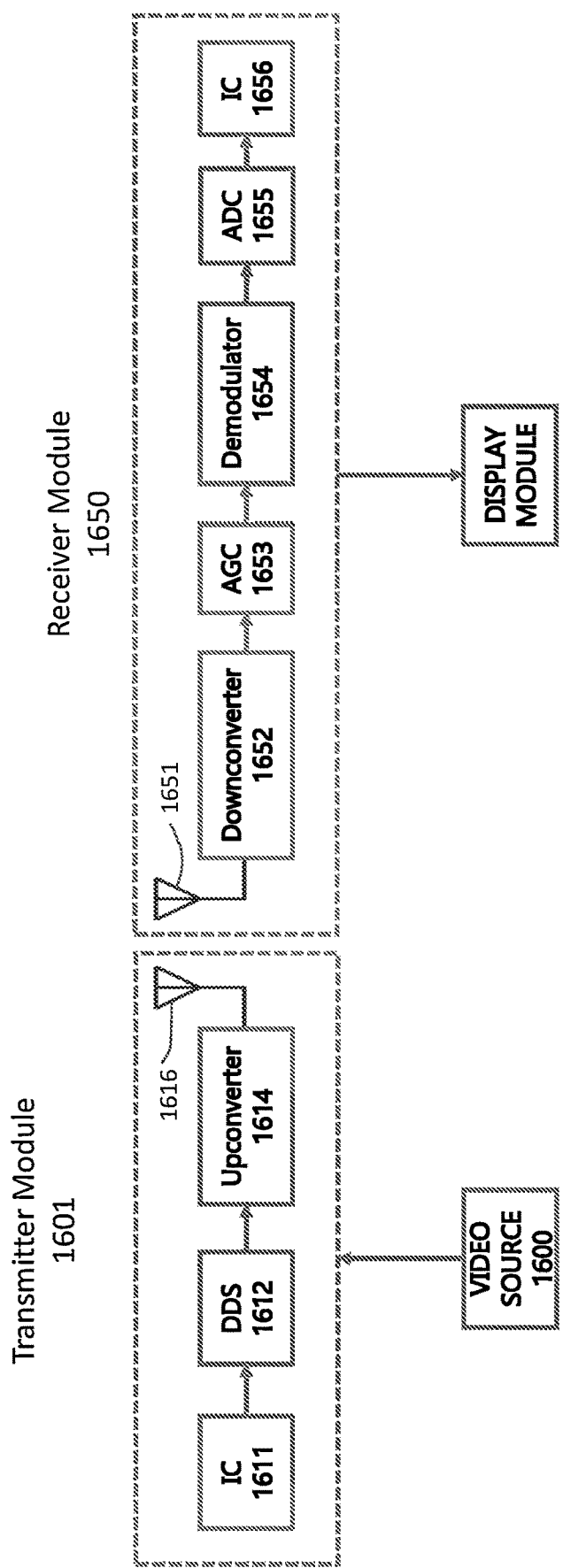
FIG. 16 illustrates a system for practical implementation of the ASVM, according to an embodiment.

FIG. 16 illustrates a system for practical implementation of the ASVM, according to an embodiment. The transmitter module 1601 includes an integrated circuit (IC) 1611, a DDS 1612, an upconverter 1614 and a transmission antenna 1616. The transmitter module 1601 is fed with video frames by video source 1600. The receiver module 1650 include reception antenna 1651, downconverter 1652, AGC 1653, demodulator 1654, ADC 1655 and IC 1656. The receiver module 1650 outputs reconstructed video frames to a display module or memory unit or any other unit.

Video Footage Processing for Low-Latency

A video is a sequence of images (frames) that are processed electronically and displayed on a screen with sufficient rapidity to create the effect of motion. Streaming high-quality video over a wireless link requires compression. A common compression approach involves inter-frame coding: instead of transmitting all frames of single footage, only a small portion of these frames are transmitted (i.e., keyframes). The rest of the frames only carry the information about the difference between the keyframe and any adjacent frames (i.e., predicted frames). This way, the amount of data for transmission is significantly minimized and the full footage is reconstructed once received.

One way to assess the quality of a wireless link is the proportion of corrupted or lost packages due to fluctuating signal-to-noise ratio. Corrupted data in digital video footage is characterized by loss or incorrectness of pixel data in a frame or a loss of the whole frame. When a raw picture, such as a frame from raw video footage, loses part of its pixel data in random order, the picture might stay readable to the human eye. It takes a significant amount of random pixel data absent from the picture for the picture to become indistinct.

However, since most of the frames in an encoded video do not carry full pixel info, but rather only the definition of the relativeness with other frames, hence when these frames are corrupted or ascent during a transmission, the footage becomes uninterpretable. To restore the missing information, error concealment algorithms are implemented into the decoding party. Such error-correction techniques cause video latency, with the delay coefficient highly dependent on the link quality. Furthermore, error correction techniques are not perfect; once the link quality drops significantly, the errors introduced through corrected frames propagate to the successive frames until the image quality becomes completely uninterpretable. In an attempt to improve the error correction process, various Forward Error Correction (FEC) techniques are employed. FEC methods add redundant information to the packets, allowing further decoding and error correction without retranslation. However, data redundancy requires larger bandwidth; when bandwidth is limited the resolution of the transmitted footage is lowered proportionally, resulting in degraded quality loss of critical details in the footage.

Teleoperation of remote robotic systems, such as drones, and other unmanned remotely-controlled vehicles, require extremely low-latency video streaming to properly control the device. Furthermore, the wireless link with such remote and high mobility devices might become extremely noisy and undermine the ability to receive digitally encoded video.

In the present invention, video footage is pre-processed and prepared for further processing by the Uni Weight Image Sub Framing (UWISF) method described herein, so it can be broadcasted even through a highly noisy wireless link without compression, and with a constant latency rate; and occupy a reasonable and controlled bandwidth. The received footage guarantees a high level of details of interest—i.e., human capability to instantly recognize and distinguish important information from the footage, particularly information that is critical to navigate and control a remotely-operated unmanned vehicle. The UWISF is implemented into a transmitter module, whereupon the footage is broadcasted through [n] separate radio carriers, and further received by a receiver module, whereupon it is reconstructed, improved using the real-time frame denoising method described herein; and projected to a display module.

In UWISF processing of the video footage, each frame is subdivided into [n] subframes. The number of subframes depends on the available bandwidth, the number of subcarriers present in the radio system, and the desired video quality. Since each subframe occupies an independent radio sub-carrier, lowering the video quality will reduce the amount of data each radio sub-carrier transmits, therefore reducing the overall bandwidth required for the link. Increasing the number of subframes occupies more bandwidth. The subframes are equal in weight, i.e., the number of pixels per each; moreover, every single subframe carries enough information for interpretation of the footage and it is sufficient for teleoperation (The information that is required for effective teleoperation may include all major details of the video, such as but not limited to persons, objects, obstacles, openings in walls, etc.—any information that might hamper the ability of the teleoperator to manipulate the remote robotics and drones), and the absence of one or more of the subframes has a minimal impact on the interpretation of the footage. Each pixel in the original frame is assigned to a different subframe while ensuring that two adjacent pixels will not be assigned to the same subframe.

In one aspect, the method may comprise the following steps:
 a. The first pixel on the top raw is assigned to subframe 1, the second in the raw is assigned to subframe 2, and so on, until a pixel is assigned to subframe [n]. Then, the next pixel in the raw is again assigned to subframe 1 and so on, until the last pixel in this raw is assigned.
 b. The first pixel of the second raw will be assigned to subframe [n]; the next pixel is assigned to subframe 1 and so on until the last pixel in this raw is assigned.
 c. In the third raw, the first pixel will be assigned to subframe [n−1], the next to subframe [n], and so on, until the last pixel in the last raw is assigned. This creates a diagonal pattern in which each subframe contains data about non-adjacent diagonals present in the frame.

The first pixel on the top raw may be assigned to any subframe other than 1, provided that the following pixels will be assigned according to the above method. Moreover, there is no importance to the numbering of the subframes.

Furthermore, the first pixel in the raw can be either from the left or from the right of the raw, provided that consistency will be maintained through the assignment process. The selection of pixel assignment direction will determine the direction of subframes diagonals.

A pre-processing of the raw footage may take place prior to the UWISF method processing, thereby preparing it for further manipulation and increasing the footage interpretability upon reconstruction. The pre-processing might include one or more of the following steps, performed on each of the footage frames: (a) brightness intensification to compensate brightness loss due to further UWISF processing; (b) Contrast Enhancement, to emphasize image details by highlighting different grey levels and color scattering; (c) Edge Enhancement, whereby the edges of the image are emphasized as to improve recognition of important details in the frame. Edging Enhancement is particularly beneficial to overcome blurring in the reconstructed picture, due to the real-time frame denoising method disclosed herein (d) Square root filter, whereby the darkened areas of the frame are brightened with minimal impact on the bright areas of the frame.

The pre-processing steps mentioned thereof are standard image processing methods well known to a person skilled in the art.

An additional pre-processing method, namely the Half Resolution Zero Padding, may be applied to further reduce the required data bandwidth for each subframe that is created by the UWISF. Half Resolution Zero Padding divides each frame into two half-frames in the following manner:
 a. For a frame resolution of i*j, all frame rows are numbered from 1 to j, and pixels in each row are numbered from 1 to i.
 b. The first half-frame only contains information about odd pixels in odd rows and even pixels in even rows.
 c. The second half-frame only contains information about even pixels in odd rows and odd pixels in even rows.

The Half Resolution Zero Padding thereby divides the frame in a checkboard-style manner, wherein the ostensible white squares (pixels) are represented by the first half-frame and the black squares (pixels) are represented by the second half-frame. The UWISF method is then applied to each half-frame in an alternated manner (take each half frame, perform the UWISF steps on each—creating two UWISF half-frames, and then transmit them one by one, or transmitting only one of the UWISF half-frames and then continue to the next sub-frame), whereupon a separate set of subframes is created for each half-frame. The reconstruction process of half-frames combined with the UWISF method is more fully set forth herein.

The UWISF method and the pre-processing methods described therein may be implemented using Field Programmable Gate-Arrays (FPGAs), microcontrollers, Central Processing Units (CPUs), or any other computational means.

Upon segmentation of the frame or half-frame, through the UWISF method, each subframe is assigned to a radio subcarrier. Since each subcarrier contains only a 1/n portion of each frame in the footage, it occupies a much smaller bandwidth than the raw footage. Therefore, the redundancy of each subcarrier channel is higher compared to a single wideband channel.

Impressing and encoding the subframe information on the radio subcarrier may be implemented using the modulation techniques described herein, namely ASVM or OFDM-RASK, and also using any other available modulation technique, e.g., orthogonal frequency-division multiplexing (OFDM), Multiple-input, multiple-output orthogonal frequency-division multiplexing (MIMO-OFDM), analog frequency modulation (FM), Quadrature Amplitude Modulation (QAM) family of digital modulation methods, or any other suitable modulation scheme.

The transmitter broadcasts all [n] subcarriers via designated frequencies.

The receiver receives all [n] subcarriers and attempts to reconstruct the original footage by reversing the subframe assignment method described herein.

In the reconstruction process of footage that underwent Half Resolution Zero Padding processing, the receiver module reconstructs the first half-frame and sends it to a display module, whilst replacing the missing pixels belonging to the second half-frame with zero values (black-colored pixels) or other consistent color value, and then immediately reconstructs the second half-frame in the same manner; and sends the resulting frame to a display module. The rapid interchanging projection of both half-frames is not detectable by a human eye and creates an illusion of a full-resolution frame, whereupon occupying only half of the bandwidth required to transmit such a frame.

Each of the subcarriers is prone to errors and data corruption. However, since different subcarriers will have different paths to the receiver, the errors will be randomly distributed in time; therefore, the chances that two adjacent pixels in the reconstructed frame will become corrupted are decreased significantly.

The receiver constantly monitors the Signal-to-Noise Ratio (SNR) of each subcarrier and classifies each received pixel as a "valid pixel" (i.e., pixel that is received with sufficient SNR) or as an "invalid pixel" (i.e., received with insufficient SNR).

The process of footage reconstruction on the receiver side results in a series of frames, each comprises a plurality of subframes. Each frame comprises valid and invalid pixels. The real-time image denoising technique is performed for each frame, during its reconstruction process.

In one aspect, the method of real-time frame denoising may comprise the following steps:
a. if the pixel is valid, display it and classify it as a "valid neighbor".
b. if the pixel is invalid, and there is at least one valid neighbor that was received before that pixel, calculate the color value of the invalid pixel. One way to calculate the color value of the invalid pixel is by assigning it the same value as one of its nearest valid neighbors. Another way to do so is by calculating a color gradient from few adjacent valid neighbors. Due to the nature of video projection, valid neighbors will either be on the left side and the same row as the invalid pixel or the rows above the invalid pixel.

Yet another method (these methods can work together or separately. E.g., the system might first look for valid neighbors; if no valid neighbors are found, the system tries to retrieve the missing info from previous frames) for real-time frame denoising is by referencing previously reconstructed frames. In this case, when a pixel is classified invalid, but in the previous frame the same pixel was valid, its color value can be assigned to the invalid pixel.

Moreover, another method for real-time frame denoising is to combine the two approaches. If a pixel is classified invalid, and in the previous frame the same pixel was invalid, yet received a calculated value based on its neighbors, the pixel in the current frame may receive the same color value.

There may be provided a system for transmission and consequent reception of video footage, the system may include a transmitter module and/or a receiver module.

The transmitter module may be configured to Receiving raw video footage from a camera or other source of a motion picture, Pre-processing the raw footage using the various methods described herein, Processing the footage using the UWISF method described herein, which results in a series of subframes, and Broadcasting each subframe through a designated radio link that uses a plurality of subcarriers, whereas each subcarrier transmits a series of subframes.

The receiver module may be configured to Receiving simultaneously all subcarriers broadcasted by a transmitter module, Reconstructing the original footage by combining all subframes from all subcarriers, and alternating half-frames produced by the Half Resolution Zero Padding pre-processing method described herein, Performing real-time image denoising methods described herein, to improve footage clarity and interpretability, and Dispatching the footage for further projection on a display module.

There may be provided a UWISF method for real-time dynamic partition of video footage, thereby creating a plurality of subframes for each frame of the original footage, whereas each subframe contains pixel information about several diagonals of the frame, in a way described in the embodiment of the present invention.

There may be provided a half-resolution zero padding method for pre-processing footage aimed to increase the frame-to-second (fps) speed thereof, and comprising the following steps: (i) Creating two half-frames from each original frame of the footage, whereas each half-frame contains half of the pixels of the original frame, according to the method described in the embodiment of the present invention, (ii) Sending each half-frame for projection on the display module, and replacing the missing pixels that belong to the second half-frame with black or otherwise colored pixels, (iii) Sending the second half-frame for projection on the display module immediately following the first one, in the same manner, and creating a visual illusion of a single frame.

There may be provided a real-time image denoising method of a wirelessly transmitted video stream, comprising of the following steps: (i) The signal-to-noise (SNR) ratio is recorded during frame reception and assigned for each received pixel. (ii) The pixels are classified into valid and invalid pixels according to the SNR. (iii) The invalid pixels are corrected using one or more of the following methods: (a) copying pixel color values from valid pixels that were received prior to the invalid pixel, and are close enough to the invalid pixel location in the frame, (b) By calculating a color gradient from valid pixels that were received prior to the invalid pixel, and are close enough to the invalid pixel location in the frame, (c) By copying pixel color values from previously received frames, whereas the pixel that is located at the same coordinates as the invalid pixel in the current frame is valid, or (d) Combination of the above methods.

Figure 17:
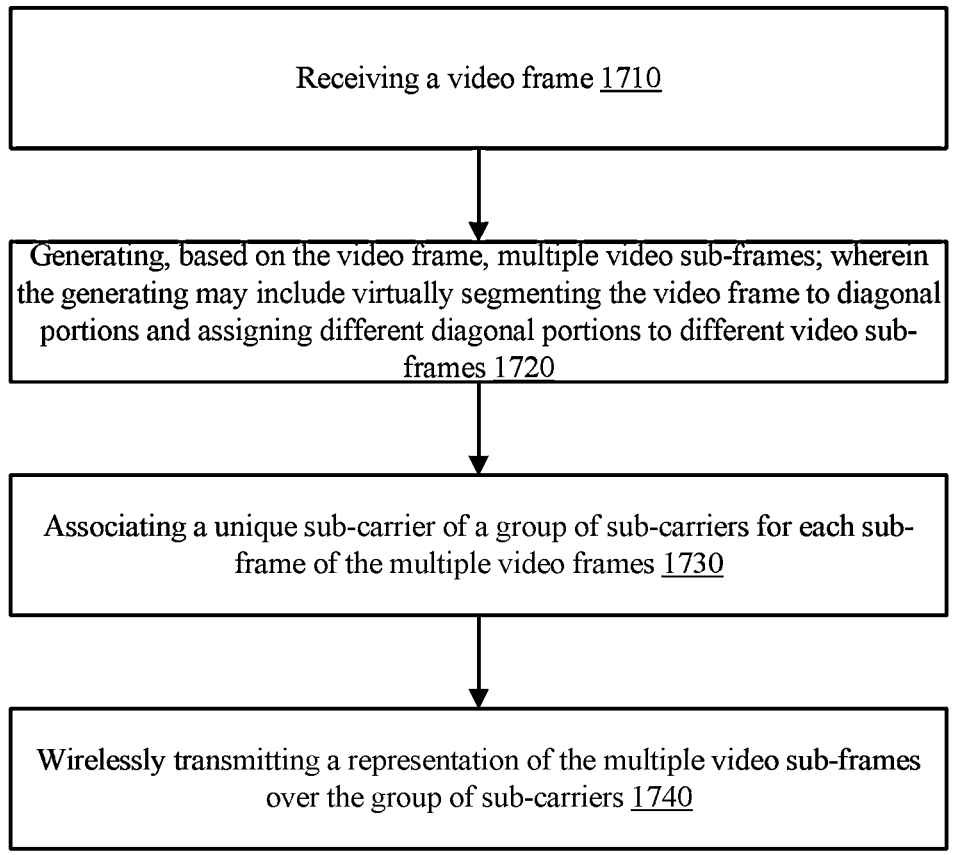
FIG. 17 illustrates an example of a method.

FIG. 17 illustrates method 1700 for wirelessly transmitting video related content.

Method 1700 may start by step 1710 of receiving a video frame.

Step 1710 may be followed by step 1720 of generating, based on the video frame, multiple video sub-frames; wherein the generating may include virtually segmenting the video frame to diagonal portions and assigning different diagonal portions to different video sub-frames.

Step 1720 may be followed by step 1730 of associating a unique sub-carrier of a group of sub-carriers for each sub-frame of the multiple video frames. The associating may be static or dynamic.

Step 1730 may be followed by step 1740 of wirelessly transmitting a representation of the multiple video sub-frames over the group of sub-carriers.

Each video sub-frame may include information required to interpret a content captured by the video frame.

The information required to interpret the content may include at least a minimal amount of information sufficient for object detection of one or more objects within the content captured by the video frame.

The method may include dynamically determining a number of the multiple video sub-frames based on available bandwidth of the wireless medium, and/or a maximal number of sub-carriers, and/or a target quality of the video frame.

A video sub-frame of the multiple video sub-frames may not include adjacent pixels of the video frame. In this case the diagonal portions are 1-pixel wide. Alternatively—a video sub-frame may include adjacent pixels—for example a small portion (for example up to 1, 5, 10, 15, 20 percent) of adjacent pixels.

A video sub-frame of the multiple video sub-frames may include at least two of the diagonal portions and does not include adjacent diagonal portions.

The method may include ignoring half of the diagonal portions. Thus-only half of the video frame is transmitted. A majority of the image may be transmitted.

The generating may include pre-processing the video frame.

The pre-processing may include at least one of brightness intensification, contrast Enhancement, and edge enhancement.

The information required to interpret the content may include at least a minimal amount of information sufficient for object detection of one or more objects within the content captured by the video frame.

The video frame may be captured by a camera of a drone and wherein the wirelessly transmitting is executed by a transmitter of the drone.

The method may include simultaneously transmitting, video sub-frame symbols indicative of multiple pixels of the video sub-frame. The simultaneous transmission may include transmitting representations of pixels of an entire diagonal portion or of pixels of more than a single diagonal portion, or pixels of a part of the diagonal portion.

FIG. 18 illustrates method 1800 for reconstructing wirelessly transmitted video related content.

Method 1800 may start by step 1810 of wirelessly receiving a noisy representation of multiple video sub-frames carried over a group of sub-carriers. A unique sub-carrier of the group of sub-carriers was allocated to each sub-frame of multiple video sub-frames of a video frame. The video sub-frames were generated by virtually segmenting a video frame to diagonal portions and assigning different diagonal portions to different video sub-frames.

Step 1810 may be followed by step 1820 of reconstructing the video related content based on the noisy representation of multiple video sub-frames, wherein the reconstructing may include denoising.

The denoising may include reconstructing a content of an invalid pixel based on value of one or more adjacent pixels of the video frame.

The denoising may include reconstructing a content of an invalid pixel based on a value of at least one other valid pixel of at least one other frame, the at least one other valid pixel is located at a same coordinate as the invalid pixel.

Figure 19:
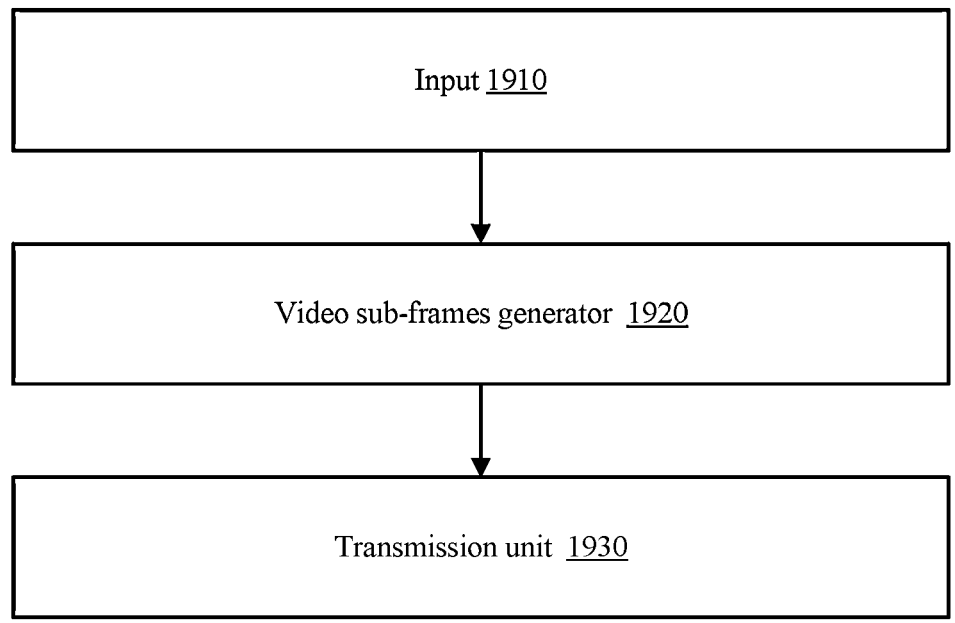
FIG. 19 illustrates an example of a method.

FIG. 19 illustrates an example of a wireless transmitter 1900 that may include (a) an input 1910 for receiving a video frame; (b) a video sub-frames generator 1920 that is configured to generate, based on the video frame, multiple video sub-frames; wherein a generating of the multiple video sub-frames may include virtually segmenting the video frame to diagonal portions and assigning different diagonal portions to different video sub-frames; and (c) a transmission unit 1930 that is configured to wirelessly transmit a representation of the multiple video sub-frames over the group of sub-carriers. A unique sub-carrier of a group of sub-carriers is associated with each sub-frame of the multiple video frames.

The wireless transmitter 1900 may be configured to execute method 1700. An example of an implementation of the wireless transmitter is illustrated in FIG. 8.

Figure 20:
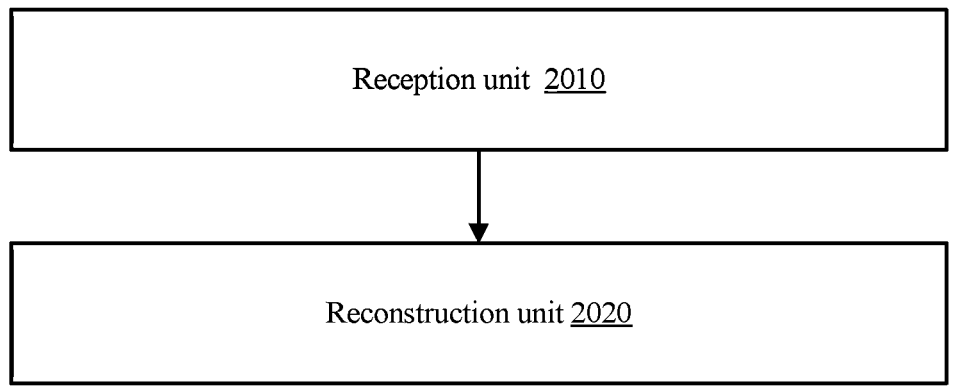
FIG. 20 illustrates an example of a method.

FIG. 20 illustrates an example of wireless receiver 2000 that may include (a) a reception unit 2010 that is configured to wirelessly receive a noisy representation of multiple video sub-frames carried over a group of sub-carriers; wherein a unique sub-carrier of the group of sub-carriers was allocated to each sub-frame of multiple video sub-frames of a video frame; wherein the video sub-frames were generated by virtually segmenting a video frame to diagonal portions and assigning different diagonal portions to different video sub-frames; and (b) a reconstruction unit 2020 that is configured to reconstruct the video related content based on the noisy representation of multiple video sub-frames, wherein the reconstructing may include denoising.

The wireless receiver 2000 may be configured to execute method 1800.

There may be provide a non-transitory computer readable medium for wirelessly transmitting video related content, the non-transitory computer readable medium stores instructions for: receiving a video frame; generating, based on the video frame, multiple video sub-frames; wherein the generating may include virtually segmenting the video frame to diagonal portions and assigning different diagonal portions to different video sub-frames; associating a unique sub-carrier of a group of sub-carriers for each sub-frame of the multiple video frames; and wirelessly transmitting a representation of the multiple video sub-frames over the group of sub-carriers.

A modulation process of a radio signal carrier is essential for data transmission. In digital modulation techniques, the type of a modulation scheme defines the number of symbol changes per unit of time (i.e., symbol rate), each symbol can carry one or more bits of information (therefore affecting the link bit-rate, i.e., effective data rate). Video streaming over a wireless link requires a high data rate, thus the bit rate should be much higher than the symbol rate; this can be provided with modulation schemes such as the QAM family of digital modulation methods usually over OFDM, and more. Although these modulation schemes allow high data rates, the actual data throughput highly depends on achieving a certain SNR.

Wireless communication links with high mobility requirements are prone to sharp and sudden SNR degradation due to several factors: corruption of the wireless signal due to signal distortion, attenuation, etc. SNR degradation causes a higher bit error rate (BER) during demodulation, which in turn increases latency and reduces the throughput of the communication system.

Moreover, in high mobility applications, phase modulation schemes (such as in QAM), BER is rising due to phase errors accumulated at the receiver side.

Therefore, such modulation schemes are less suitable for real-time high-mobility video transmission applications in complex environments (e.g., dense urban areas). In addition, high BER may cause severe disruptions in video communication due to the sensitivity of various digital video compression methods (e.g., H.264, H.265, etc.) to bit error rate.

Analog modulation is another legacy method for video transmission. In analog video modulation, the pixels in the frames are modulated using continuous voltage tuning, therefore occupying a relatively small bandwidth though with a limited resolution. Analog video modulation offers constant latency, unrelated to the link quality; however, in this method synchronization pulses are embedded into the modulation scheme to allow recognition of new rows in a frame (i.e., horizontal sync pulses) and new frames (vertical sync pulses). Sync and pixel information redundancy is practically similar (FIG. 11); however, failure to demodulate the sync pulses correctly results in video desynchronization, leading to severe footage degradation.

In the present invention, two new modulation methods, namely the Advanced Shifting Video Modulation (ASVM) and Orthogonal Frequency Division Multiplexing—Relative Amplitude Shift Keying (OFDM-RASK) are proposed to overcome the shortcomings of both analog and digital current modulation methods.

In ASVM, the video transmission uses two different modulation schemes based on frequency shift keying (FSK), in the same radio link: one for the pixel information and the second for synchronization pulses. The different modulation schemes impose different redundancy levels for the two types of data (i.e., pixel data and synchronization data), whereas the redundancy of the synchronization data is much higher than that of the pixel data. The high redundancy level of the synchronization data enables its retrieval and successful demodulation even with extremely low SNR, overcoming desynchronization issues frequently seen in standard analog video communication. The different modulation schemes are more fully set forth herein:

For each frame of the video, the pixel color values are transmitted row by row, as a continuous stream of symbols, whereas each transmitted symbol represents the color value of a sole pixel (i.e., M-ary transmission). Each symbol carries a plurality of bits, therefore the bit rate of the pixel information is higher than the symbol rate. The number of bits in each symbol defines the color depth of each pixel: however, in a similarly given bandwidth, increasing the bit rate (and consequently color depth) requires higher SNR. The bit rate may be pre-set, or adaptive. In adaptive bit-rate, the SNR is constantly monitored and bit-rate varies according to the applicable noise conditions. Moreover, the bandwidth and the bit rate may be optimized to meet specific conditions, for example, a narrower bandwidth can be used to transmit black and white video (with a range of grey tones).

Synchronization pulses are transmitted to indicate the beginning of a new row (H-Sync word) and a new frame (V-Sync word). Each sync word is transmitted as a sequence of symbols, whereas each symbol carries a single bit (i.e., binary modulation scheme). The sync words are known both to the transmitter and the receiver.

Each sync word starts with a preamble sequence for the purpose of synchronization of transmitter and receiver clocks. The preamble comprises a plurality of alternating (for example 0101010)1 and 0 bits.

During transmission of the video stream, the receiver looks for the H-sync word and the V-sync word (in one example the binary words are different for H-sync or V-sync, it should be noted that the same binary word can be used in both H-sync and V-sync—but it may be less effective), using an autocorrelation process. Autocorrelation is a mathematical tool for finding repeating patterns in a given signal, in low SNR conditions, and even when the signal is obscured by noise. Autocorrelation may be implemented using Field Programmable Gate-Array (FPGA), microcontroller, Central Processing Units (CPU), or any other computational means.

The ASVM method, therefore, increases the redundancy of the synchronization data, which is critical for continuous operation in low SNR conditions. Whereas corruption or loss of some pixel information may be tolerated, a failure in the interpretation of synchronization data will immediately lead to video unintelligibility.

Moreover, the use of sync-words opens the possibility of data encryption, and it may be dynamically controlled by a cryptographic algorithm.

The synchronization pulses are modulated using a Binary FSK (B-FSK) method; whereas the pixels are modulated using the Multiple FSK (M-ary FSK). However, both co-exist in a single radio channel. Hence, the transmitter broadcasts a V-sync word to indicate a new frame; whereupon the transmission continues with H-sync word and first-row pixels values, whereas each new row is indicated by an H-sync word, and the process repeats itself until a new frame is indicated by a V-sync word. H-sync words may be broadcasted more than once in each row, to enhance the synchronization redundancy level.

The ASVM method utilizes frequency modulation, therefore the link BER is not affected by the changing distance between the transmitter and the receiver, as opposed to phase modulation techniques that are common in digital modulation methods such as QAM.

A system for implementation of the ASVM may comprise the following elements (see FIG. 16):

a. A transmitter module, comprising
  i. An integrated circuit (IC), that receives video data from a video source (e.g., camera), performs pre-processing of the footage and controls the output data stream. The IC may be implemented in a Field Programmable Gate-Array (FPGA), a microcontroller, a Central Processing Unit (CPU), or in any other computational means.
  ii. A direct digital synthesizer (DDS), that receives a digital data stream from the IC and performs FSK modulation, while maintaining the modulation schemes for the synchronization data and for the pixel data (both may be generated by DSS, B-FSK for sync and M-FSK for data) to enable ASVM. The use of DDS enables the frequency agility and the modulation bandwidth required for M-ary FSK, along with the B-FSK required for synchronization.
  iii. An upconverter, that receives the signal from the DDS (i.e., intermediate frequency) and moves it up to the desired radio frequencies, which share the channel.
  iv. An antenna, or a set of antennas, to broadcast the signal.
b. A receiver module, comprising
  i. An antenna, or a set of antennas, to receive the signal;
  ii. A downconverter, that receives the signal from the antenna(s) (i.e., radio frequency) and moves it down to the intermediate frequency;
  iii. A demodulator module, to demodulate the signal according to the ASVM method.
  iv. An automatic gain control (AGC) module, to normalize signal amplitude that might vary due to differences in received signal strength;
  v. An analog-to-digital converter module (ADC), to recreate the binary stream
  vi. Another IC, who processes the binary stream and reconstructs the footage, whereupon it is sent to a display module The system for implementation of the ASVM may comprise one or more channels, whereas each channel may be used as a subcarrier of the main channel and may share the same IC at the transmitter and the receiver.

The application referred, for simplicity of explanation, to two examples of modulation schemed-M-ary FSK and B-FSK. It should be noted that the ASVM can use other pairs of modulations. For example—the ASVM can be implemented, mutatis mutandis, by using any basic modulation techniques such as Analog Modulation, Frequency Modulation and Phase Modulation where synchronization pulses are modulated by one of B-ASK (Binary Amplitude Shift keying), B-FSK (Binary Frequency Shift keying), or B-PSK (Binary Phase Shift keying). The pixels may be modulated by one of M-ASK (M Array Amplitude Shift keying), M-FSK (M Array Frequency Shift keying), or M-PSK (M Array Phase Shift keying).

There may be provided a ASVM method for transmission and consequent reception of video footage, that includes (a) transmission of a video in a frame-by-frame method, whereas for transmission of each frame a synchronization pulse is transmitted to indicate the beginning thereof; another synchronization pulse is transmitted to indicate the beginning of each row in the frame or a specific location in the row, and the pixel data to indicate the color value of each pixel in the row; (b) Modulation of the video, using two different modulation schemes, one for the pixel information and the second for synchronization pulses; both broadcasted in an alternating way using a single radio channel: (i) A B-FSK modulation scheme for synchronization pulses, whereas each type of synchronization pulse is represented by a binary sequence (a sync word), and each modulated symbol transmits a single bit. (ii) An M-ary FSK modulation scheme for pixel values, whereas modulated symbol consists of one element from an alphabet of colors, represented in a binary combination.

The method may include (iii) applying an autocorrelation process by a receiver, to demodulate and detect sync words and identify synchronization pulses in the video stream, and demodulation of the video at the receiver and reconstruction thereof, in a frame-by-frame manner.

There may be provided a system that may include a transmitter that is capable of generating ASVM for a given video data, and a receiver that is capable of ASVM demodulation and reconstruction of the video data.

The ASVM method may be is utilized on several frequency subcarriers, simultaneously, and may share the same IC at the transmitter and the receiver.

The OFDM-RASK method is aimed to narrow down the overall frequency spectra that is required by the ASVM method, or by other modulation methods that are intended to transmit large amounts of data. It uses an OFDM high-level modulation method, but unlike traditional digital video transmission systems, the OFDM subcarriers are not modulated with QAM or QPSK, which cause high BER and require high SNR to demodulate.

In OFDM-RASK, each OFDM sub-carrier is modulated with Amplitude Shift Keying. When the OFDM sub-carriers are modulated with Binary Amplitude Shift Keying (B-ASK), all sub-carriers are either present (ON) or not (OFF), wherein the ON mode represents a binary 1 and the OFF represents a binary 0, or verse visa. The B-ASK over OFDM creates a stable and reliable signal, however with relatively low data throughput. On the other hand, when the OFDM sub-carriers are modulated with multiple levels of Amplitude Shift Keying (M-ASK), the data throughput is significantly higher, however the SNR required for successful demodulation is higher and therefore it has a lower redundancy level.

The ASK modulation method, when used in mobile indoor conditions, suffers from a non-stable path between the transmitter and the receiver and varying amplitude changes, therefore affecting the demodulation process and hampering successful signal interpretation. To overcome this drawback, the concept of a reference sub-carrier(s) is introduced herein, creating the Relative (M-level) Amplitude Shift Keying modulation method.

The OFDM signal contains a plurality of Sub-Carriers. Each modulated symbol is always represented by all the sets of the Sub-Carriers. In the OFDM-RASK method, one or more sub-carriers become reference sub-carrier(s). A reference sub-carrier is a sub-carrier that is always transmitted with the maximal and constant amplitude level. The receiver interprets the amplitude level of each sub-carrier by relating it to the reference sub-carriers that were received in the OFDM set. Since the OFDM sub-carriers are closely spaced in frequency, the implications of multipath and other interference phenomena are similar enough for the sub-carriers, and since each modulated symbol is represented by all Sub-Carriers including Reference Sub-Carrier(s), by normalizing the amplitude of the Reference Sub-Carrier, it is possible to recognize the original amplitude level of each Sub-Carrier during each symbol.

The number of amplitude levels for M-ASK modulation defines the required SNR for demodulation. Fewer amplitude levels require lower SNR for successful demodulation, but also limit the data throughput. The number of amplitude levels can be either pre-defined or dynamically changing by the transmitter during transmission to accommodate SNR changes, i.e. adjusted to the actual link quality at any given time.

The two options of OFDM-RASK sub-carrier modulation, namely OFDM-R(M)ASK and OFDM-R(B)ASK, are implemented in the same radio link: one for the pixel information and the second for synchronization pulses respectively. The different modulation schemes impose different redundancy levels for the two types of data (i.e., pixel data and synchronization data), whereas the redundancy of the synchronization data is much higher than that of the pixel data. The high redundancy level of the synchronization data enables its retrieval and successful demodulation even with low SNR, overcoming desynchronization issues frequently seen in standard analog video communication. The different modulation schemes are more fully set forth herein:

The OFDM-RASK method utilizes OFDM with ASK modulation with reference sub-carriers, therefore the link BER is not affected by the changing distance between the transmitter and the receiver, as opposed to phase modulation techniques that are common in digital modulation methods such as QAM.

The system for implementation of the OFDM-RASK may comprise one or more OFDM channels, whereas each channel may be used as a subcarrier of the main channel, and may share the same IC at the transmitter and the receiver.

There may be provided an OFDM-RASK method for transmission and consequent reception of video footage, that includes (a) transmission of a video in a frame-by-frame method, whereas for transmission of each frame a synchronization pulse is transmitted to indicate the beginning thereof; another synchronization pulse is transmitted to indicate the beginning of each row in the frame or a specific location in the row, and the pixel data to indicate the color value of each pixel in the row; (b) Modulation of the video, using two different modulation schemes, one for the pixel information and the second for synchronization pulses; both broadcasted in an alternating way using a single radio channel: (i) A B-ASK over OFDM-RASK modulation scheme, namely OFDM-R(B)ASK for synchronization pulses, whereas each type of synchronization pulse is represented by a binary sequence (a sync word)—for example—there is a time synchronization between the Tx and the Rx, and the Rx also relies on the preamble. If a preamble is detected, the Rx expects a sync word) and each modulated symbol transmits a single bit or several bits, (ii) An M-ary ASK over OFDM-RASK modulation scheme, namely OFDM-R(M)ASK for pixel values, whereas modulated symbol consists of one element from an alphabet of colors, represented in a binary combination.

The OFDM-RASK method may include (iii) applying an autocorrelation process by a receiver, to demodulate and detect sync words and identify synchronization pulses in the video stream, and demodulation of the video at the receiver and reconstruction thereof, in a frame-by-frame manner.

There may be provided a system that may include a transmitter that is capable of generating OFDM-RASK for a given video data, and a receiver that is capable of OFDM-RASK demodulation and reconstruction of the video data.

The OFDM-RASK method may be utilized simultaneously on several frequency subcarriers and may share the same IC at the transmitter and receiver.

This application provides a significant technical improvement over the prior art—especially an improvement in computer science and wireless communication.

Figure 21:
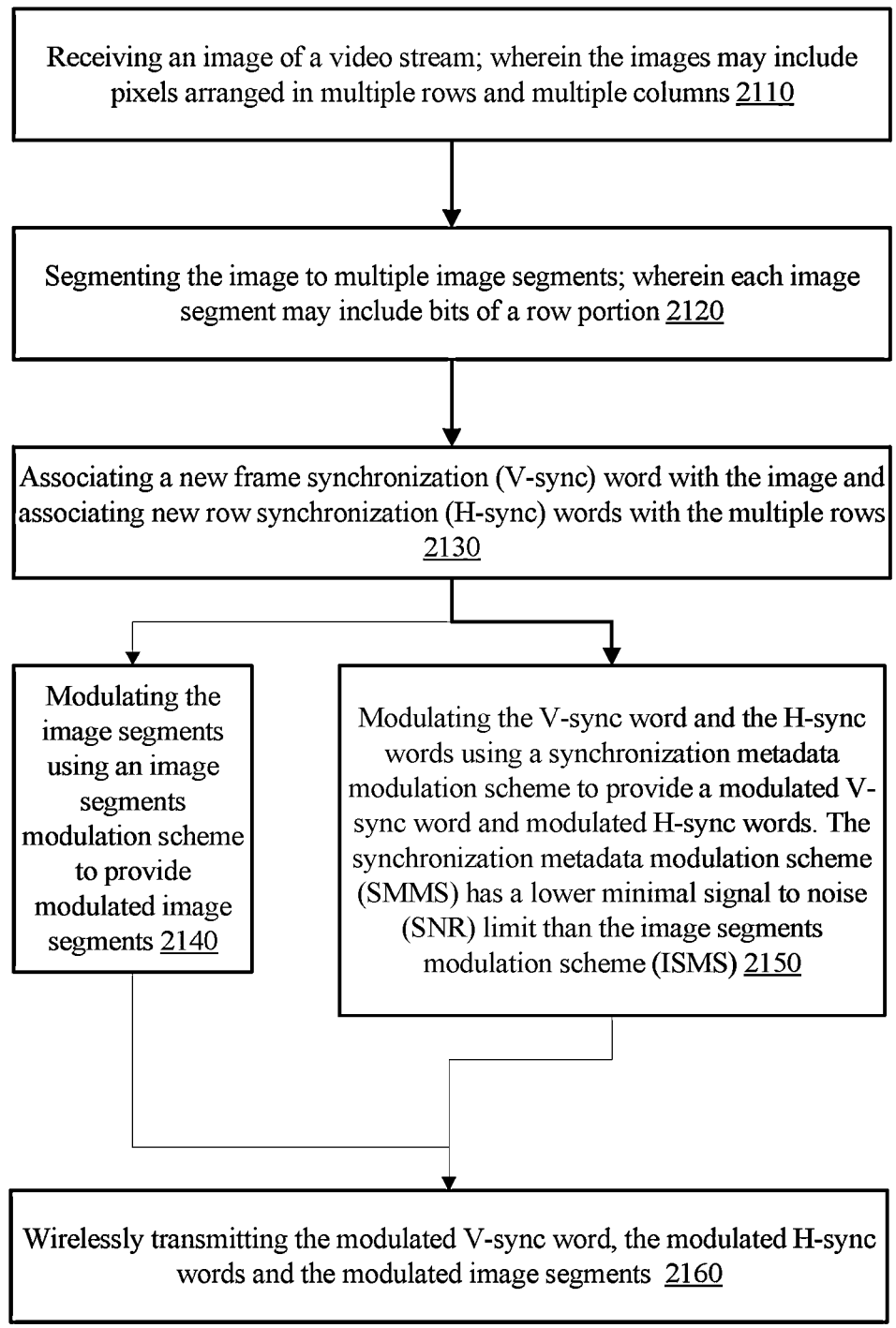
FIGS. 21-22 illustrates examples of methods.

FIG. 21 illustrates an example of method 2100 for wirelessly transmitting video related content.

Method 2100 may include step 2110 of receiving an image of a video stream; wherein the images may include pixels arranged in multiple rows and multiple columns.

Step 2110 may be followed by step 2120 of segmenting the image to multiple image segments; wherein each image segment may include bits of a row portion.

Step 2120 may be followed by step 2130 of associating a new frame synchronization (V-sync) word with the image and associating new row synchronization (H-sync) words with the multiple rows.

Step 2130 may be followed by step 2140 of modulating the image segments using an image segments modulation scheme to provide modulated image segments.

Step 2130 may also be followed by step 2150 of modulating the V-sync word and the H-sync words using a synchronization metadata modulation scheme to provide a modulated V-sync word and modulated H-sync words. The synchronization metadata modulation scheme (SMMS) has a lower minimal signal to noise (SNR) limit than the image segments modulation scheme (ISMS).

A minimal SNR limit defines a minimal SNR of content that can be reconstructed if modulated with a certain modulation. Accordingly—the SMMS (having the lower minimal SNR limit)—allows a receiver to reconstruct content with lower SNR values than the ISMS. The SMMS may be regarded as more robust or having more redundancy than the ISMS.

Steps 2140 and 2150 may be followed by step 2160 of wirelessly transmitting the modulated V-sync word, the modulated H-sync words and the modulated image segments.

Step 2160 may include at least one of the following:
a. Wirelessly transmitting the modulated V-sync word prior to wirelessly transmitting of any of the modulated image segments.
b. Wirelessly transmitting a modulated H-sync word associated with a row before wirelessly transmitting any image segment of the row.
c. Wirelessly transmitting at least one intermediate modulated V sync word after wirelessly transmitting at least some image segments of the image and before completing wirelessly transmitting of the image.
d. Wirelessly transmitting an initial modulated H-sync word associated with a row before wirelessly transmitting any image segment of the row, and wirelessly transmitting at least one intermediate modulated H sync word associated with the row after wirelessly transmitting at least some image segments of the row and before completing wirelessly transmitting of the row.

Steps 2140 and 2150 may be executed by different modulators of by the same modulation unit. For example—steps 2140 and 2150 may be executed by a direct digital synthesizer.

The synchronization metadata modulation scheme of step 2150 may be a binary modulation scheme. The image segments modulation of step 2140 may be a M-bit modulation scheme, wherein M exceed two.

The synchronization metadata modulation scheme of step 2150 may be a binary frequency shift keying (FSK) modulation scheme. The image segments modulation of step 2140 may be a K-bit FSK modulation scheme, wherein K exceed two.

The synchronization metadata modulation scheme and the image segments modulation may include frequency modulation.

The synchronization metadata modulation scheme and the image segments modulation may be different relative amplitude shift keying (RASK) orthogonal frequency-division multiplexing (OFDM) sub-carrier modulations.

The synchronization metadata modulation scheme of step 2150 may be a binary OFDM-RASK sub-carrier modulation. The image segments modulation of step 2140 may be a K-bit RASK OFDM sub-carrier modulation wherein K exceeds two.

There may be a non-transitory computer readable medium for wirelessly transmitting video related content, the non-transitory computer readable medium stores instructions for receiving an image of a video stream; wherein the images may include pixels arranged in multiple rows and multiple columns; segmenting the image to multiple image segments; wherein each image segment may include bits of a row portion; associating a new frame synchronization (V-sync) word with the image and associating new row synchronization (H-sync) words with the multiple rows; modulating the image segments using an image segments modulation scheme to provide modulated image segments; modulating the V-sync word and the H-sync words using a synchronization metadata modulation scheme to provide a modulated V-sync word and modulated H-sync words; wherein the synchronization metadata modulation scheme has a lower minimal signal to noise limit than the image segments modulation; and wirelessly transmitting the modulated V-sync word, the modulated H-sync words and the modulated image segments.

Figure 22:
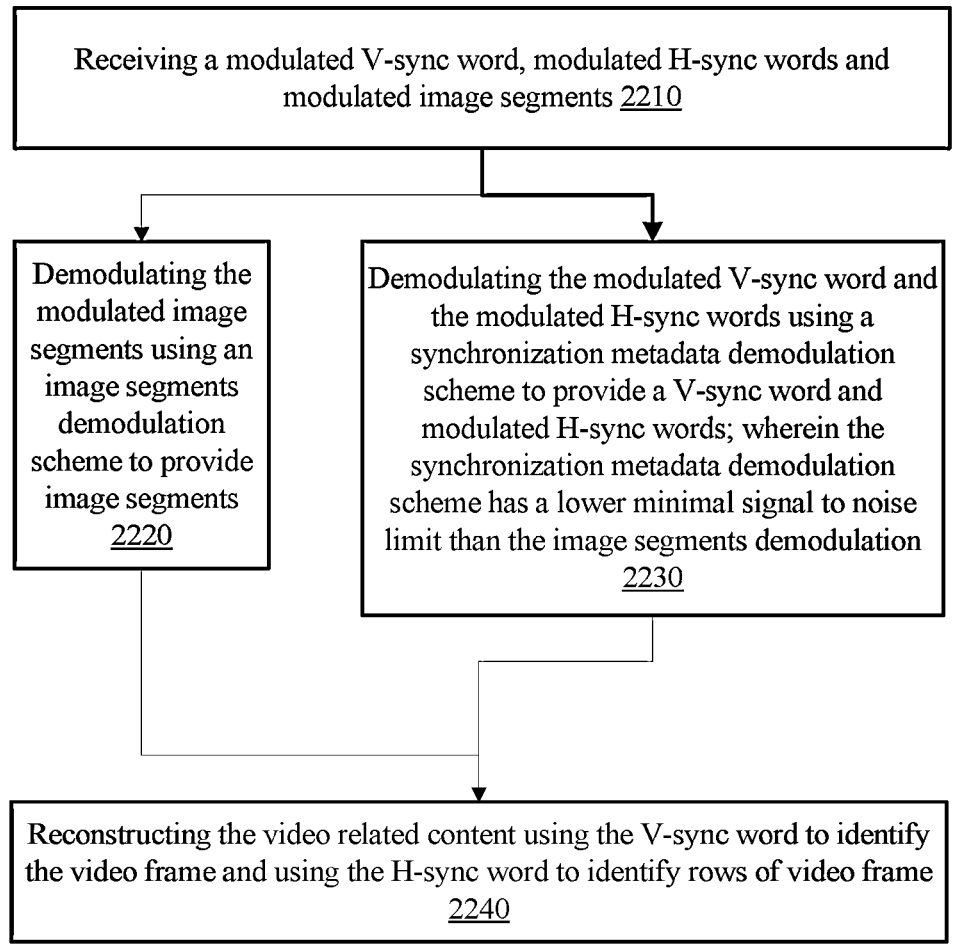

FIG. 22 illustrates method 2200 for reconstructing a video frame.

Method 2200 may start by step 2210 of receiving a modulated V-sync word, modulated H-sync words and modulated image segments.

Step 2210 may be followed by step 2220 of demodulating the modulated image segments using an image segments demodulation scheme to provide image segments.

Step 2220 may be followed by step 2230 of demodulating the modulated V-sync word and the modulated H-sync words using a synchronization metadata demodulation scheme to provide a V-sync word and modulated H-sync words; wherein the synchronization metadata demodulation scheme has a lower minimal signal to noise limit than the image segments demodulation.

Step 2230 may be followed by step 2240 of reconstructing the video related content using the V-sync word to identify the video frame and using the H-sync word to identify rows of video frame.

Step 2230 may include reversing the modulation of steps 2140 and/or 2150 of method 2100.

There may be a non-transitory computer readable medium for wirelessly transmitting video related content, the non-transitory computer readable medium stores instructions for executing method 2100.

There may be provided a non-transitory computer readable medium for reconstructing a video frame, the non-transitory computer readable medium stores instructions for receiving a modulated V-sync word, modulated H-sync words and modulated image segments; demodulating the modulated image segments using an image segments demodulation scheme to provide image segments; demodulating the modulated V-sync word and the modulated H-sync words using asynchronization metadata demodulation scheme to provide a V-sync word and modulated H-sync words; wherein the synchronization metadata demodulation scheme has a lower minimal signal to noise limit than the image segments demodulation; and reconstructing the video related content using the V-sync word to identify the video frame and using the H-sync word to identify rows of video frame.

Figure 23:
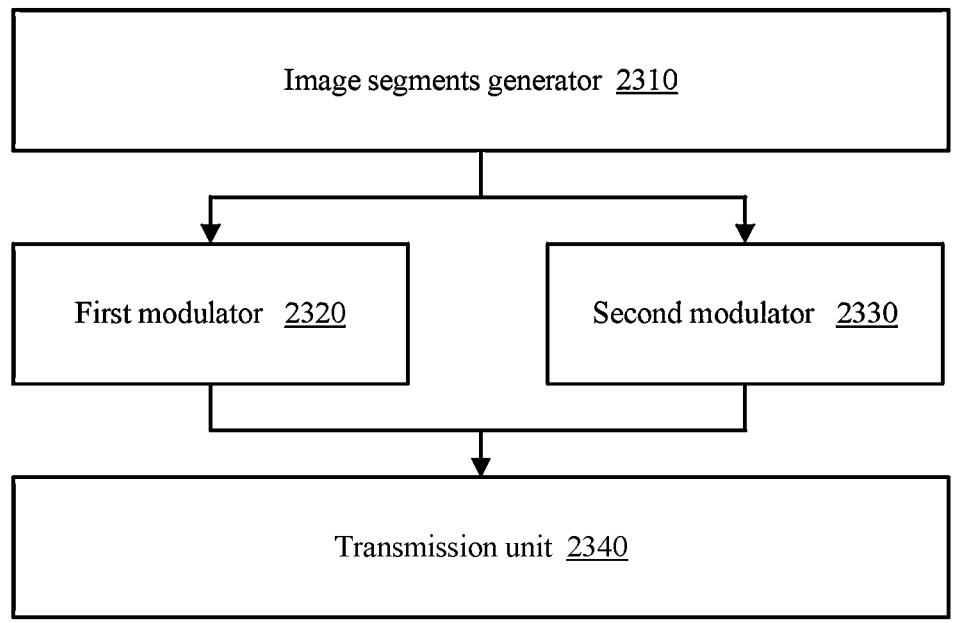
FIG. 23-24 illustrates examples of a receiver and a transmitter.

FIG. 23 illustrates an example of a wireless transmitter 2300 that may include: (a) an image segments generator 2310 that is configured to (ii) receive an image of a video stream, wherein the images may include pixels arranged in multiple rows and multiple columns; and (ii) segment the image to multiple image segments; wherein each image segment may include bits of a row portion; (b) a first modulator 2320 that is configured to modulate the image segments using an image segments modulation scheme to provide modulated image segments; (c) a second modulator 2330 that is configured to modulate a new frame synchronization (V-sync) word and new row synchronization (H-sync) words using a synchronization metadata modulation scheme to provide a modulated V-sync word and modulated H-sync words; wherein the synchronization metadata modulation scheme has a lower minimal signal to noise limit than the image segments modulation; wherein the V-sync word with the image and the H-sync words may be associated with the multiple rows; and (d) a transmission unit 2340 that is configured to wirelessly transmit the modulated V-sync word, the modulated H-sync words and the modulated image segments.

An example of an implementation of the wireless transmitter is illustrated in FIG. 16.

Figure 24:
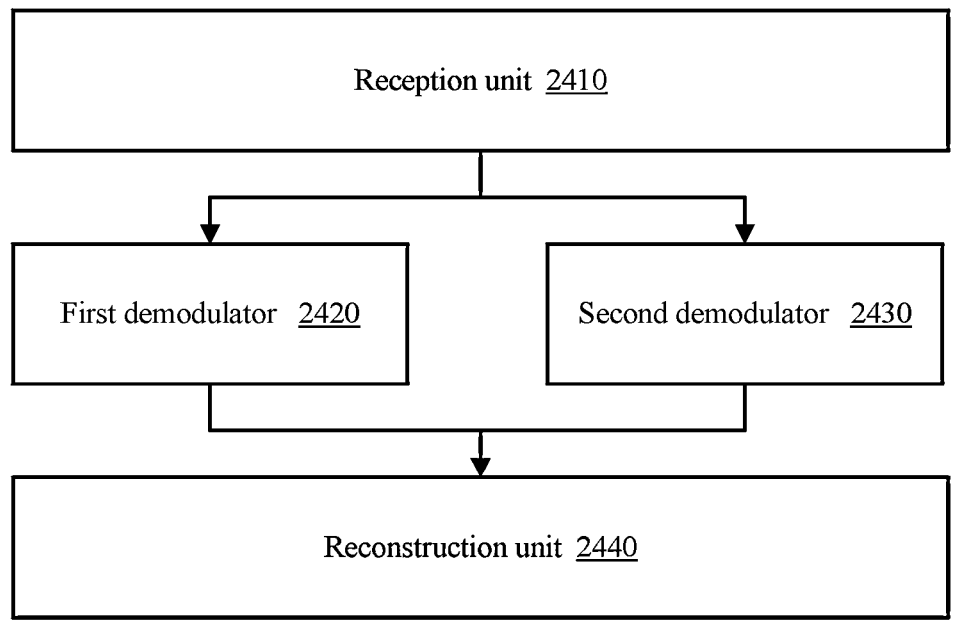

FIG. 24 illustrates an example of a wireless receiver 2420 that may include (a) a reception unit 2430 that is configured to receive a modulated V-sync word, modulated H-sync words and modulated image segments; (b) a first demodulator 2420 that is configured to demodulate the modulated image segments using an image segments demodulation scheme to provide image segments; (c) a second demodulator 2430 that is configured to demodulate the modulated V-sync word and the demodulated H-sync words using a synchronization metadata demodulation scheme to provide a V-sync word and modulated H-sync words. The synchronization metadata demodulation scheme has a lower minimal signal to noise limit than the image segments demodulation; and (d) a reconstruction unit 2440 that is configured to reconstruct the video related content using the V-sync word to identify the video frame and using the H-sync word to identify rows of video frame.

An example of an implementation of the wireless receiver is illustrated in FIG. 16.

It should be noted that methods 1700 and 2100 may be combined.

It should be noted that methods 1800 and 2200 may be combined.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method-respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system.

The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for wirelessly transmitting video related content, the method comprises:
   receiving a video frame;
   generating, based on the video frame, multiple video sub-frames; wherein the generating comprises virtually segmenting the video frame to diagonal portions and assigning different diagonal portions to different video sub-frames;
associating a unique sub-carrier of a group of sub-carriers for each sub-frame of the multiple video frames; and
   wirelessly transmitting a representation of the multiple video sub-frames over the group of sub-carriers.

2. The method according to claim 1 wherein each video sub-frame comprises information required to interpret a content captured by the video frame.

3. The method according to claim 2 wherein the information required to interpret the content comprises at least a minimal amount of information sufficient for object detection of one or more objects within the content captured by the video frame.

4. The method according to claim 1 comprising dynamically determining a number of the multiple video sub-frames based on at least one out of available bandwidth, a maximal number of sub-carriers, or a target quality of the video frame.

5. The method according to claim 1 wherein a video sub-frame of the multiple video sub-frames does not include adjacent pixels of the video frame.

6. The method according to claim 1 wherein a video sub-frame of the multiple video sub-frames comprises at least two of the diagonal portions and does not include adjacent diagonal portions.

7. The method according to claim 1 comprising ignoring half of the diagonal portions.

8. The method according to claim 1 wherein the generating comprises pre-processing the video frame.

9. The method according to claim 8 wherein the pre-processing comprises at least one of brightness intensification, contrast Enhancement, and edge enhancement.

10. The method according to claim 1 wherein the information required to interpret the content comprises at least a minimal amount of information sufficient for object detection of one or more objects within the content captured by the video frame.

11. The method according to claim 1 wherein the video frame is captured by a camera of a drone and wherein the wirelessly transmitting is executed by a transmitter of the drone.

12. The method according to claim 1 wherein comprising simultaneously transmitting, each video sub-frame symbols indicative of multiple pixels of the video sub-frame.

13. A wireless transmitter, comprising:
   an input for receiving a video frame;
   a video sub-frames generator that is configured to generate, based on the video frame, multiple video sub-frames; wherein a generating of the multiple video sub-frames comprises virtually segmenting the video frame to diagonal portions and assigning different diagonal portions to different video sub-frames; and
   a transmission unit that is configured to wirelessly transmit a representation of the multiple video sub-frames over the group of sub-carriers; wherein a unique sub-carrier of a group of sub-carriers is associated with each sub-frame of the multiple video frames.

14. The wireless transmitter according to claim 13 wherein a video sub-frame of the multiple video sub-frames does not include adjacent pixels of the video frame.

* * * * *